(12) United States Patent
Nakahara

(10) Patent No.: US 8,948,131 B2
(45) Date of Patent: Feb. 3, 2015

(54) RADIO COMMUNICATION SYSTEM, RADIO COMMUNICATION METHOD, AND GATEWAY

(71) Applicant: Hitachi, Ltd., Tokyo (JP)

(72) Inventor: Naruhito Nakahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 207 days.

(21) Appl. No.: 13/733,549

(22) Filed: Jan. 3, 2013

(65) Prior Publication Data

US 2013/0223339 A1 Aug. 29, 2013

(30) Foreign Application Priority Data

Feb. 24, 2012 (JP) ................................. 2012-038899

(51) Int. Cl.
*H04W 4/00* (2009.01)
*H04W 36/00* (2009.01)
*H04W 8/18* (2009.01)
*H04W 80/10* (2009.01)
*H04W 88/12* (2009.01)

(52) U.S. Cl.
CPC ................ *H04W 8/18* (2013.01); *H04W 80/10* (2013.01); *H04W 4/005* (2013.01); *H04W 88/12* (2013.01)
USPC .......................................... 370/331; 455/436

(58) Field of Classification Search
CPC ........... H04B 7/18539; H04B 7/18567; H04B 7/18578; H04W 28/02; H04W 4/005; H04W 4/008; H04W 4/023; H04W 72/1289; H04W 72/0406; H04W 76/023; H04W 80/10; H04W 8/18
USPC ................... 370/328–332, 338; 455/436–444
See application file for complete search history.

(56) References Cited

U.S. PATENT DOCUMENTS

| 6,112,085 A * | 8/2000 | Garner et al. ................. 455/428 |
| 2011/0154022 A1 | 6/2011 | Cheng et al. |
| 2013/0223356 A1* | 8/2013 | Khoshnevis et al. ......... 370/329 |

(Continued)

FOREIGN PATENT DOCUMENTS

JP 2011/524136 A 8/2011

OTHER PUBLICATIONS

Min Chen ; Jiafu Wan ; Gonzalez, S. ; Xiaofei Liao ; Leung, V.C.M., "A Survey of Recent Developments in Home M2M Networks". Communications Surveys & Tutorials, IEEE vol. 16. Publication Year: 2014, pp. 98-114.*

(Continued)

*Primary Examiner* — Thai Hoang
(74) *Attorney, Agent, or Firm* — Volpe and Koenig, P.C.

(57) ABSTRACT

The number of required GWs is reduced to suppress the number of facilities by storing MS information on an M2M connection in an external device, and cooperating with the GWs such as mobile GWs in a mobile system in which the M2M connection and a connection other than the M2M connection are mixed together. When an MS migrates to an idle state, the MS stores the MS information in the external device once, and deletes information from an ASN-GW. When the MS migrates from the idle state to an active state, the ASN-GW again draws the MS information from the external device, and again stores the MS information within the device, to thereby enable a communication. If a resource of the active state is short within the device, a migration from the idle state to the active state is enabled with the use of another ASN-GW.

17 Claims, 38 Drawing Sheets

(56) References Cited

U.S. PATENT DOCUMENTS

2013/0250771 A1* 9/2013 Yu et al. .................. 370/241
2013/0322413 A1* 12/2013 Pelletier et al. ............ 370/336
2014/0177449 A1* 6/2014 Novak et al. ............. 370/241
2014/0177536 A1* 6/2014 Novak et al. ............. 370/329
2014/0177537 A1* 6/2014 Novak et al. ............. 370/328

OTHER PUBLICATIONS

Laya, A. ; Alonso, L. ; Alonso-Zarate, J.; "Is the Random Access Channel of LTE and LTE-A Suitable for M2M Communications? A Survey of Alternatives." Communications Surveys & Tutorials, IEEE vol. 16. Publication Year: 2014 , pp. 4-16.*

* cited by examiner

| Call No. | MSID | State | Active Index | Idle Index | Ext. Index |
|---|---|---|---|---|---|
| 1 | 000001 | Active | 1 | null | null |
| 2 | 000005 | Idle | null | 1 | 20 |
| 3 | 000012 | Idle | null | 2 | 30 |
| 4 | 000007 | Null | null | null | null |
| 5 | 000101 | Active | 2 | null | null |
| : | : | : | : | : | : |
| n | 001005 | Idle | null | k | 1,000,000 |

FIG. 4

| Active Index | Call No. | MS_Info. |
|---|---|---|
| 1 | 1 | MS IDENTIFICATION INFORMATION, SECURITY INFORMATION, SF Info. QoS INFORMATION, ETC. |
| 2 | 5 | MS IDENTIFICATION INFORMATION, SECURITY INFORMATION, SF Info. QoS INFORMATION, ETC. |
| 3 | null | null |
| : | : | MS IDENTIFICATION INFORMATION, SECURITY INFORMATION, SF Info. QoS INFORMATION, ETC. |
| m | 990 | MS IDENTIFICATION INFORMATION, SECURITY INFORMATION, SF Info. QoS INFORMATION, ETC. |

FIG. 5

| Idle Index | Call No. | Paging Info. |
|---|---|---|
| 1 | 2 | Paging, Location Information |
| 2 | 3 | Paging, Location Information |
| 3 | null | null |
| : | : | Paging, Location Information |
| k | n | Paging, Location Information |

FIG. 6

| Ext. Index | MS_Info. |
|---|---|
| 1 | MS IDENTIFICATION INFORMATION, SECURITY INFORMATION, SF Info. QoS INFORMATION, ETC. |
| : | MS IDENTIFICATION INFORMATION, SECURITY INFORMATION, SF Info. QoS INFORMATION, ETC. |
| 10 | null |
| : | null |
| p | MS IDENTIFICATION INFORMATION, SECURITY INFORMATION, SF Info. QoS INFORMATION, ETC. |

FIG. 7

| Call No. | MSID | State | Active Index (Not M2M Index) | Idle Index | Ext. Index |
|---|---|---|---|---|---|
| 1 | 000001 | Active | 1 | null | null |
| 2 | 000005 | Idle | null | 1 | 10 |
| 3 | 000012 | Idle | 3 | 2 | null |
| 4 | 000007 | Null | null | null | null |
| 5 | 000101 | Active | 2 | null | null |
| : | : | : | : | : | : |
| n | 001005 | Idle | null | k | 1,000,000 |

FIG. 18

| Active Index (Not M2M Index) | Call No. | MS_Info. |
|---|---|---|
| 1 | 1 | MS IDENTIFICATION INFORMATION, SECURITY INFORMATION, SF Info. QoS INFORMATION, ETC. |
| 2 | 5 | MS IDENTIFICATION INFORMATION, SECURITY INFORMATION, SF Info. QoS INFORMATION, ETC. |
| 3 | 3 | MS IDENTIFICATION INFORMATION, SECURITY INFORMATION, SF Info. QoS INFORMATION, ETC. |
| : | : | null |
| m | 990 | MS IDENTIFICATION INFORMATION, SECURITY INFORMATION, SF Info. QoS INFORMATION, ETC. |

FIG. 19

| No. | Domain | M2M |
|---|---|---|
| 1 | HHH.com | False |
| 2 | Power.com | True |
| 3 | TV.com | True |
| : | : | : |
| q | ISP.com | False |

FIG. 22

| Call No. | MSID | Domain | M2M |
|---|---|---|---|
| 1 | 000001 | Power.com | Ture |
| 2 | 000005 | HHH.com | False |
| 3 | 000012 | Power.com | Ture |
| 4 | 000007 | ISP.com | False |
| 5 | 000101 | TV.com | True |
| : | : | : | : |
| n | 001005 | HHH.com | False |

FIG. 23

| Idle Index | Call No. | Paging Info. |
|---|---|---|
| 1 | 2 | Paging , Location Information |
| 2 | 3 | Paging , Location Information |
| 3 | 1 | Paging , Location Information |
| : | : | Paging , Location Information |
| k | n | Paging , Location Information |

FIG. 27

| Ext. Index | MS_Info. |
|---|---|
| 1 | MS IDENTIFICATION INFORMATION, SECURITY INFORMATION, SF Info. QoS INFORMATION, ETC. |
| : | MS IDENTIFICATION INFORMATION, SECURITY INFORMATION, SF Info. QoS INFORMATION, ETC. |
| 10 | MS IDENTIFICATION INFORMATION, SECURITY INFORMATION, SF Info. QoS INFORMATION, ETC. |
| : | null |
| p | MS IDENTIFICATION INFORMATION, SECURITY INFORMATION, SF Info. QoS INFORMATION, ETC. |

FIG. 28

| Call No. | MSID | State | Active Index | Idle Index | Ext. Index |
|---|---|---|---|---|---|
| 1 | 000001 | Idle | null | 3 | 10 |
| 2 | 000005 | Idle | null | 1 | 20 |
| 3 | 000012 | Idle | null | 2 | 30 |
| 4 | 000007 | Null | null | null | null |
| 5 | 000101 | Active | 2 | null | null |
| : | : | : | : | : | : |
| n | 001005 | Idle | null | k | 1,000,000 |

FIG. 29

| Active Index | Call No. | MS_Info. |
|---|---|---|
| 1 | null | null |
| 2 | 5 | MS IDENTIFICATION INFORMATION, SECURITY INFORMATION, SF Info. QoS INFORMATION, ETC. |
| 3 | null | null |
| : | : | MS IDENTIFICATION INFORMATION, SECURITY INFORMATION, SF Info. QoS INFORMATION, ETC. |
| m | 990 | MS IDENTIFICATION INFORMATION, SECURITY INFORMATION, SF Info. QoS INFORMATION, ETC. |

FIG. 30

| Active Index | Call No. | MS_Info. |
|---|---|---|
| 1 | 1 | MS IDENTIFICATION INFORMATION, SECURITY INFORMATION, SF Info. QoS INFORMATION, ETC. |
| 2 | 5 | MS IDENTIFICATION INFORMATION, SECURITY INFORMATION, SF Info. QoS INFORMATION, ETC. |
| 3 | null | null |
| : | : | MS IDENTIFICATION INFORMATION, SECURITY INFORMATION, SF Info. QoS INFORMATION, ETC. |
| m | 990 | MS IDENTIFICATION INFORMATION, SECURITY INFORMATION, SF Info. QoS INFORMATION, ETC. |

FIG. 31

| Call No. | MSID | State | Active Index | Idle Index | Ext. Index |
|---|---|---|---|---|---|
| 1 | 000001 | Active | 1 | null | null |
| 2 | 000005 | Idle | null | 1 | 20 |
| 3 | 000012 | Idle | null | 2 | 30 |
| 4 | 000007 | Null | null | null | null |
| 5 | 000101 | Active | 2 | null | null |
| : | : | : | : | : | : |
| n | 001005 | Idle | null | k | 1,000,000 |

FIG. 32

| Idle Index | Call No. | Paging Info. |
|---|---|---|
| 1 | 2 | Paging , Location Information |
| 2 | 3 | Paging , Location Information |
| 3 | null | null |
| : | : | Paging , Location Information |
| k | n | Paging , Location Information |

FIG. 33

| Ext. Index | MS_Info. |
|---|---|
| 1 | MS IDENTIFICATION INFORMATION, SECURITY INFORMATION, SF Info. QoS INFORMATION, ETC. |
| : | MS IDENTIFICATION INFORMATION, SECURITY INFORMATION, SF Info. QoS INFORMATION, ETC. |
| 10 | null |
| : | null |
| p | MS IDENTIFICATION INFORMATION, SECURITY INFORMATION, SF Info. QoS INFORMATION, ETC. |

FIG. 34

| Idle Index | Call No. | Paging Info. |
|---|---|---|
| 1 | 2 | Paging , Location Information |
| 2 | 3 | Paging , Location Information |
| 3 | 1 | Paging , Location Information |
| : | : | Paging , Location Information |
| k | n | Paging , Location Information |

FIG.35

| Call No. | MSID | State | Active Index (Not M2M Index) | Idle Index | Ext. Index |
|---|---|---|---|---|---|
| 1 | 000001 | Idle | 1 | 3 | null |
| 2 | 000005 | Idle | null | 1 | 10 |
| 3 | 000012 | Idle | 3 | 2 | null |
| 4 | 000007 | Null | null | null | null |
| 5 | 000101 | Active | 2 | null | null |
| : | : | : | : | : | : |
| n | 001005 | Idle | null | k | 1,000,000 |

FIG.36

| Call No. | MSID | State | Active Index (Not M2M Index) | Idle Index | Ext. Index |
|---|---|---|---|---|---|
| 1 | 000001 | Active | 1 | null | null |
| 2 | 000005 | Idle | null | 1 | 10 |
| 3 | 000012 | Idle | 3 | 2 | null |
| 4 | 000007 | Null | null | null | null |
| 5 | 000101 | Active | 2 | null | null |
| : | : | : | : | : | : |
| n | 001005 | Idle | null | k | 1,000,000 |

FIG.37

| Idle Index | Call No. | Paging Info. |
|---|---|---|
| 1 | 2 | Paging, Location Information |
| 2 | 3 | Paging, Location Information |
| 3 | null | null |
| : | : | Paging, Location Information |
| k | n | Paging, Location Information |

FIG.38

RADIO COMMUNICATION SYSTEM, RADIO COMMUNICATION METHOD, AND GATEWAY

CLAIM OF PRIORITY

The present application claims priority from Japanese patent application JP 2012-038899 filed on Feb. 24, 2012, the content of which is hereby incorporated by reference into this application.

BACKGROUND OF THE INVENTION

1. Field of the Invention

The present invention relates to a radio communication system, a radio communication method, and a gateway, and more particularly to a radio communication system, a radio communication method, and a gateway, such as a mobile communication system having an M2M (machine-to-machine) mobile gateway.

2. Related Art

A related art mobile system includes a mobile station MS, a base station BS, and a mobile gateway GW (ASN-GW in a WiMAX system). When the MS conduct a communication, the MS is connected to the GW such as the mobile GW through the BS, and accesses to the Internet through the mobile GW. The MS is in an active or idle state according to a communication state. The active state represents a data communicating state, and the idle state represents a standby state in which no communication is conducted, and a communication can be restarted. The mobile GW always holds the MS information on the active state and idle state, thereby enabling the data communication, or a return from the standby state to the communication state.

Also, in recent years, with the development of an information communication network and a communication technique, attention is paid to an M2M communication in which a communication is conducted between the respective machines connected to each other through a network without intervention of a person. In particular, in a social infrastructure such as electric power, water, or gas, a meter (smart meter) having a communication function has appeared.

JP-T-2011-524136 discloses a method and a device used in the M2M communication system.

In general, the mobile communication system has a tree structure. Hereinafter, an example of the mobile communication system having the tree structure will be described.

FIG. 24 is a configuration diagram of a related art mobile communication system.

The mobile system includes a mobile station (MS) 500, base stations (BSs) 400 to 403, access service network gateways (ASN-GWs) 200 and 201 that manage the BSs, and a home agent (HA) 300. The HA 300 supports a mobile IP. The HA 300 is connected to an Internet 700 when the HA 300 provides an internet service.

FIG. 25 is a diagram illustrating an idle migration sequence in the related art mobile communication system. The MS 500, the BS 400, the ASN-GW 200, and the HA 300 transfer messages to each other in conformity to a rule. A radio path 510 is established between the MS 500 and the BS 400. A path 410 such as a generic routing encapsulation (GRE) capsuling path is established between the BS 400 and the ASN-GW 200. A path 310 is established between the ASN-GW 200 and the HA 300. Data connection is conducted by those paths. When the MS 500 requests deletion (idle migration) of the MS information, the MS 500 transmits a deletion request (DREG-REQ 800) to the BS 400 whereby the BS 400 transmits an idle mode entry state change request (IM_Entry_State_Change_Req. 801) to the ASN-GW 200. Thereafter, messages are transferred according to the rule to execute an idle migration sequence (delete sequence) (IM_Entry_State_Change_Rsp. 803, DREG-CMD 802, IM_Entry_State_Change_Ack. 804, Path_Dereg_Req. 805, Path_Dereg_Rsp. 806, and Path_Dereg_Ack. 807). As a result, the ASN-GW 200 holds the MS information, and manages the MS 500 as the idle state.

FIG. 26 is a diagram illustrating an active migration sequence in the related art mobile communication system. A path 310 is established between the ASN-GW 200 and the HA 300 to conduct the data connection. When the MS 500 requests registration (active migration) of the MS information, the MS 500 transmits a registration request (REG-REQ 810) to the BS 400 whereby the BS 400 transmits an idle mode exit state change request (IM_Exit_State_Change_Req. 811) to the ASN-GW 200. Thereafter, messages are transferred according to the rule to execute an active migration sequence (registration sequence) (IM_Entry_State_Change_Rsp. 812, IM_Entry_State_Change_Ack. 813, Path_Dereg_Req. 814, Path_Dereg_Rsp. 815, REG-RSP 816, CMAC_Key_Count_Update 817, CMAC_Key_Count_Update_Ack. 818, Path_Reg_Ack. 819). As a result, the ASN-GW 200 makes a management state of the MS 500 active. Also, the MS 500, the BS 400, the ASN-GW 200, and the HA 300 transfer the messages to each other according to the rule. A radio path 511 is established between the MS 500 and the BS 400, a path 411 such as a generic routing encapsulation (GRE) capsuling path is established between the BS 400 and the ASN-GW 200 to conduct the data connection.

SUMMARY OF THE INVENTION

In general it is said that the number of MSs when the M2M network is configured by using the mobile communication system is, for example, 1,000 times or 10,000 times or more as large as the number of MSs with which persons or terminals have communicated up to now. In the related art mobile GW, because all of information (MS information) on the MSs is stored in the device, the number of required mobile GWs is explosively increased in proportion to the number of MSs, resulting in such a problem that the number of facilities is dramatically increased.

The present invention has been made in view of the above circumstances, and one object of the present invention is to reduce the number of required GWs and suppress the number of facilities by storing MS information on an M2M connection in an external device, and cooperating with the GWs such as mobile GWs in a mobile system in which the M2M connection and a connection other than the M2M connection are mixed together.

Another object of the present invention is to store, when a storage capacity of the MS information in one GW is short, the MS information in another GW (redirection).

Still another object of the present invention is to enable processing of the connection other than the M2M connection in the same state transition processing time as that in the related art, by storing the MS information on the connection other than the M2M connection within the device.

In general, the feature of the M2M communication resides in that an active state retention time is shorter, and an idle state retention time is longer. Also, because the M2M communication is mechanically controlled, it is possible to control a migration to the active state and the communication time in advance unlike a terminal with which a person communicates. Therefore, the M2M communication has the characteristic that even if it takes further slight time for connection, such a time is allowable. Also, it is possible to predict the storage capacity or traffic of the MS information required for the GW to some extent.

The present invention makes use of the above characteristics, and stores the MS information in the external device once when the MS migrates to the idle state, and deletes information from the GW such as the mobile GW. Also, in the present invention, when the MS migrates from the idle state to the active state, the mobile GW again draws the MS information from the external device, and again stores the MS information within the device, to thereby enable a communication. In this situation, in drawing the MS information from the external device, if a resource of the active state is short in the device, another mobile GW may be processed to accept the connection of an appropriate MS to enable the transition from the idle state to the active state with the use of another mobile GW.

Also, as another solution of the present invention, an M2M identifier for identifying whether a terminal is an M2M connection terminal or a terminal other than the M2M connection (connection intervening a person) is disposed in a spare bit of a terminal identifier (MSID), and the M2M connection is determined according to the M2M identifier. The MS information determined as the M2M connection is stored in an MS information storage device, and when it is determined as the connection other than the M2M connection, the MS information can be stored within the device. Also, as another means for determining the M2M connection, in a radio connection means between the MS and the base station, because the base station can recognize whether the MS has the M2M connection, or not, if it is determined as the M2M connection, the M2M identifier is allocated to the spare bit of a message between the base station and the GW (mobile GW, etc.) so that the base station notifies the GW that the MS has the M2M connection. Further, as another means for determining the M2M connection, the GW determines that the MS has the M2M connection according to domain information provided in the MS.

According to the first solving means of the present invention, there is provided a radio communication system in which a mobile station (MS) is connected to a network through a base station (BS) to conduct a machine-to-machine (M2M) communication, the radio communication system comprising:

a gateway (GW) disposed between the BS and the network; and an MS information storage device that transmits and receives MS information with respect to the GW, wherein
the gateway includes:
a call session management table that stores an MSID which is an identifier of the MS, state information indicating whether a session of the MS is in an active state or an idle state, and an external index (ext. index) with respect to a call number (call No.) allocated to the MS when the MS is connected to the BS;
an active session management table that stores the MS information which is information on the MS with the inclusion of an address of the MS with respect to the call No.;
an idle session management table that stores paging information on the MS with respect to the call No.; and
a control unit that executes migration processing between the active state and the idle state,
wherein,
when the MS requests migration from the active state to the idle state,
the gateway receives an idle migration request including an MSID from the BS, and searches the call No. on the basis of the MSID included in the idle migration request with reference to the call session management table, the gateway searches an area in which the paging information is null with reference to the idle session management table according to the call No., and sets the paging information on the MS for the searched area, the gateway searches the MS information with reference to the active session management table according to the call No., and transmits a first MS information transfer request including the MS information corresponding to the call No. to the MS information storage device, when receiving a first MS information transfer response including the ext. index corresponding to the MS information stored in the MS information storage device from the MS information storage device, the gateway acquires the ext. index included in the first MS information transfer response, the gateway changes the state information from the active state to the idle state with respect to the call No. and the MSID, stores the idle state to the state information in the call session management table, and stores the acquired ext. index, and the gateway deletes the call No. and the MS information corresponding to the call No. from the active session management table, whereby the paths for the data connection among the MS, the BS and the gateway are disconnected, and the path for the data connection between the gateway and the network is not disconnected.

According to the second solving means of the present invention, there is provided a A radio communication method in a radio communication system in which a mobile station (MS) is connected to a network through a base station (BS) to conduct a machine-to-machine (M2M) communication, the radio communication system comprising:

a gateway (GW) disposed between the BS and the network; and an MS information storage device that transmits and receives MS information with respect to the GW, wherein
the gateway includes:
a call session management table that stores an MSID which is an identifier of the MS, state information indicating whether a session of the MS is in an active state or an idle state, and an external index (ext. index) with respect to a call number (call No.) allocated to the MS when the MS is connected to the BS;
an active session management table that stores the MS information which is information on the MS with the inclusion of an address of the MS with respect to the call No.;
an idle session management table that stores paging information on the MS with respect to the call No.; and
a control unit that executes migration processing between the active state and the idle state,
wherein,
when the MS requests migration from the active state to the idle state,
the gateway receives an idle migration request including an MSID from the BS, and searches the call No. on the basis of the MSID included in the idle migration request with reference to the call session management table, the gateway searches an area in which the paging information is null with reference to the idle session management table according to the call No., and sets the paging information on the MS for the searched area, the gateway searches the MS information with reference to the active session management table according to the call No., and transmits a first MS information transfer request including the MS information corresponding to the call No. to the MS information storage device, when receiving a first MS information transfer response including the ext. index corresponding to the MS information stored in the MS information storage device from the MS information storage device, the gateway acquires the ext. index included in the first MS information transfer response, the gateway changes the state information from the active state to the idle state with respect to the call No. and the MSID, stores the idle state to the state information in the call session management table, and stores the acquired ext. index, and the gateway deletes the call No. and the MS information corresponding to the call No. from the active session management table, whereby the paths for the data connection among the MS, the BS and the gateway are disconnected, and the path for the data connection between the gateway and the network is not disconnected.

According to the third solving means of the present invention, there is provided a gateway in a radio communication system in which a mobile station (MS) is connected to a network through a base station (BS) to conduct a machine-to-machine (M2M) communication, the radio communication system comprising:

the gateway (GW) disposed between the BS and the network; and an MS information storage device that transmits and receives MS information with respect to the GW, wherein the gateway includes:

a call session management table that stores an MSID which is an identifier of the MS, state information indicating whether a session of the MS is in an active state or an idle state, and an external index (ext. index) with respect to a call number (call No.) allocated to the MS when the MS is connected to the BS;

an active session management table that stores the MS information which is information on the MS with the inclusion of an address of the MS with respect to the call No.;

an idle session management table that stores paging information on the MS with respect to the call No.; and a control unit that executes migration processing between the active state and the idle state, wherein, when the MS requests migration from the active state to the idle state, the gateway receives an idle migration request including an MSID from the BS, and searches the call No. on the basis of the MSID included in the idle migration request with reference to the call session management table, the gateway searches an area in which the paging information is null with reference to the idle session management table according to the call No., and sets the paging information on the MS for the searched area, the gateway searches the MS information with reference to the active session management table according to the call No., and transmits a first MS information transfer request including the MS information corresponding to the call No. to the MS information storage device, when receiving a first MS information transfer response including the ext. index corresponding to the MS information stored in the MS information storage device from the MS information storage device, the gateway acquires the ext. index included in the first MS information transfer response, the gateway changes the state information from the active state to the idle state with respect to the call No. and the MSID, stores the idle state to the state information in the call session management table, and stores the acquired ext. index, and the gateway deletes the call No. and the MS information corresponding to the call No. from the active session management table, whereby the paths for the data connection among the MS, the BS and the gateway are disconnected, and the path for the data connection between the gateway and the network is not disconnected.

It is possible, according to the present invention to reduce the number of required GWs and suppress the number of facilities by storing MS information on an M2M connection in an external device, and cooperating with the GWs such as mobile GWs in a mobile system in which the M2M connection and a connection other than the M2M connection are mixed together.

Also, it is possible, according to the present invention to store, when a storage capacity of the MS information in one GW is short, the MS information in another GW (redirection).

Still, it is possible, according to the present invention to enable processing of the connection other than the M2M connection in the same state transition processing time as that in the related art, by storing the MS information on the connection other than the M2M connection within the device.

BRIEF DESCRIPTION OF THE DRAWINGS

FIG. 4 is a call session management table of an ASN-GW;

FIG. 5 is an active session management table of the ASN-GW;

FIG. 6 is an idle session management table of the ASN-GW;

FIG. 7 is an MS information storage table of the MS information storage device;

FIG. 18 is call session management table according to the second embodiment of the present invention;

FIG. 19 is an active session management table according to the second embodiment of the present invention;

FIG. 22 is a table of domain set for an ASN-GW in advance according to a third embodiment of the present invention;

FIG. 23 is a domain information table for managing a correspondence relationship of an MSID, a domain, and whether to provide an M2M service, or not, according to the third embodiment of the present invention;

FIG. 27 is a diagram illustrating an example of the idle session management table after migration from the active state to the idle state;

FIG. 28 is a diagram illustrating an example of the MS information storage table after migration from the active state to the idle state;

FIG. 29 is a diagram illustrating an example of the call session management table after migration from the active state to the idle state;

FIG. 30 is a diagram illustrating an example of the active session management table after migration from the active state to the idle state;

FIG. 31 is a diagram illustrating an example of the active session management table after migration from the idle state to the active state;

FIG. 32 is a diagram illustrating an example of the call session management table after migration from the idle state to the active state;

FIG. 33 is a diagram illustrating an example of the idle session management table after migration from the idle state to the active state;

FIG. 34 is a diagram illustrating an example of the MS information storage table after migration from the idle state to the active state;

FIG. 35 is a diagram illustrating an example of the idle session management table after migration from the active state to the idle state according to the second embodiment;

FIG. 36 is a diagram illustrating an example of the call session management table after migration from the active state to the idle state according to the second embodiment;

FIG. 37 is a diagram illustrating an example of the call session management table after migration from the idle state to the active state according to the second embodiment; and FIG. 38 is a diagram illustrating an example of the idle session management table after migration from the idle state to the active state according to the second embodiment.

DETAILED DESCRIPTION OF THE PREFERRED EMBODIMENTS

Hereinafter, a description will be given of embodiments in which the present invention is applied to a mobile system.

A. First Embodiment

Figure 1:
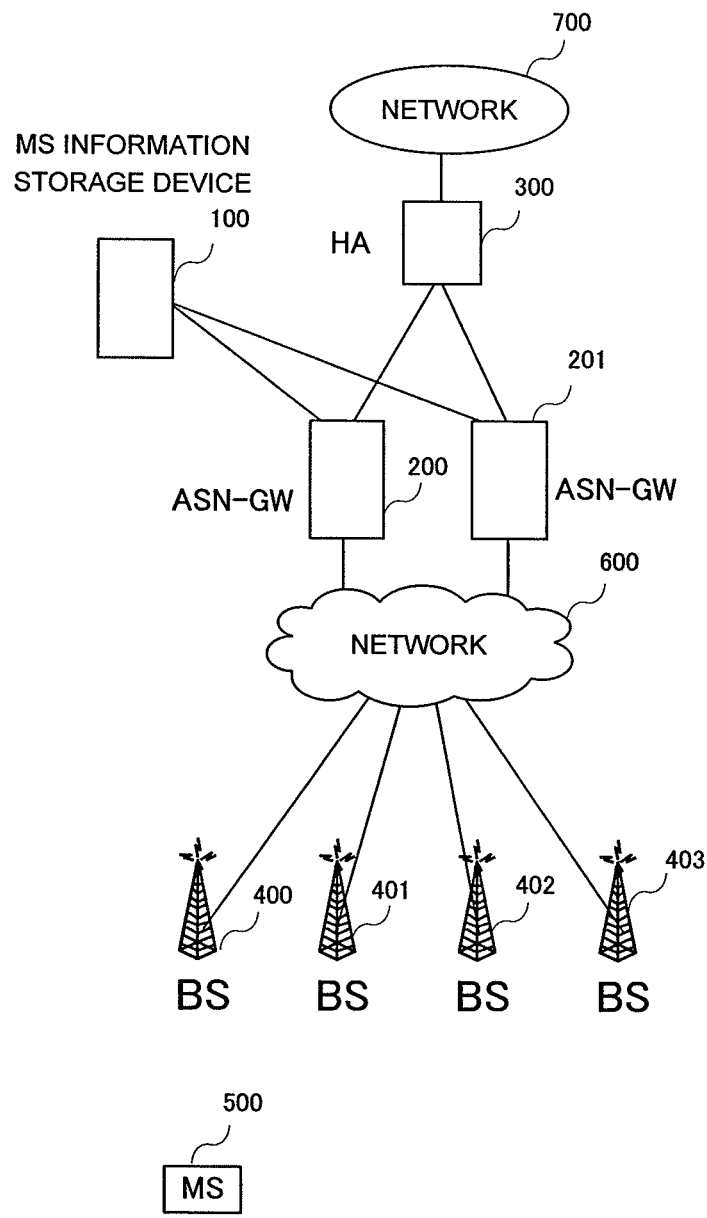
FIG. 1 is a configuration diagram of a mobile communication system according to an embodiment of the present invention.

Configuration where MS Information of an Idle State is Stored in an External Device 1. System FIG. 1 is a diagram illustrating a configuration of a mobile communication system according to this embodiment.

The mobile communication system according to this embodiment includes an MS information storage device 100, mobile station (MS) 500, base stations (BSs) 400 to 403, access service network gateways (ASN-GWs) 200 and 201 that manage the BSs, and a home agent (HA) 300. The HA 300 supports a mobile IP. The HA 300 is connected to a network 700 such as the Internet when the HA 300 provides an internet service.

Figure 2:
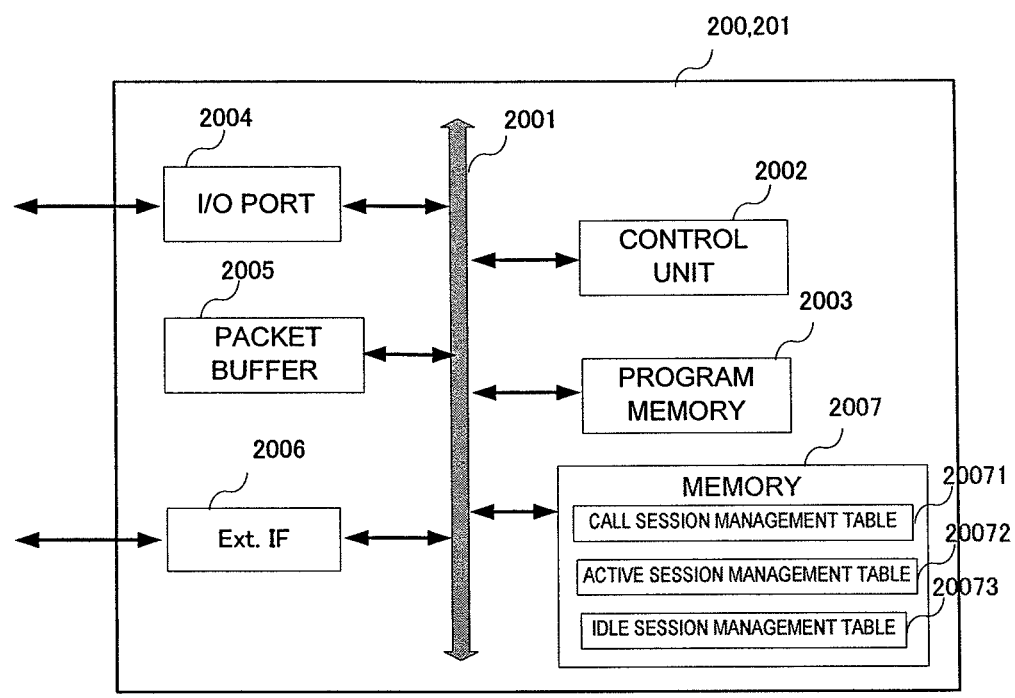
FIG. 2 is a configuration diagram of an ASN-GW according to the embodiment of the present invention.

FIG. 2 is a diagram illustrating a configuration of ASN-GWs 200 and 201 according to the embodiment of the present invention.

The ASN-GWs 200 and 201 each include an I/O port 2004 having a physical interface which is connected to the BS and the HA, a packet buffer 2005 that stores data received from the I/O port 2004, and a control unit 2002 that decrypts received data, and executes various processing such as migration processing between the active state and the idle state, transmitting and receiving processing of data such as the MS information, and processing for creating an appropriate response message. The ASN-GWs 200 and 201 each include a program memory 2003 that stores software therein, an ext. IF 2006 that communicates with the MS information storage device, a path 2001 that connects the respective functional units to each other, and a memory 2007 that stores various pieces of information therein. The memory 2007 includes a call session management table 20071, an active session management table 20072, and an idle session management table 20073.

Figure 3:
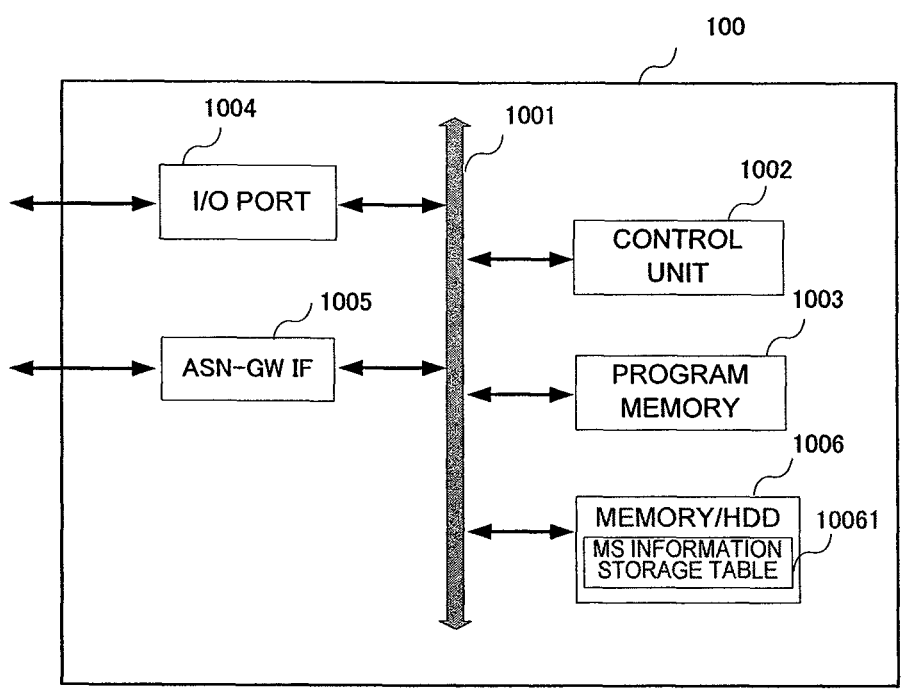
FIG. 3 is a configuration diagram of an MS information storage device according to the embodiment of the present invention.

FIG. 3 is a diagram illustrating a configuration of the MS information storage device 100 according to the embodiment of the present invention. The MS information storage device 100 includes an I/O port 1004 having a physical interface which is connected to the ASN-GW, a control unit 1002 that executes various processing such as transmitting and receiving processing of data such as the MS information, and migration processing between the active state and the idle state through the I/O port 1004, and a program memory 1003 that stores software therein. The MS information storage device 100 also includes an ASN-GW IF 1005 that communicates with the ASN-GWs 200 and 201, an HDD 1006 that stores various pieces of information including the MS information therein, and a path 1001 that connects the respective functional units to each other. The HDD 1006 includes an MS information storage table 10061.

FIG. 4 illustrates an example of the call session management table 20071 of the ASN-GW. The call session management table stores the MSID which is an identifier of the MS, a state indicative of an active state (active) in which the MS is connected to the BS, or an idle state (idle) in which the MS is not connected to the BS, an active index, an idle index, and an ext. index with respect to the call No. When the MS is connected to the BS, the ASN-GW can appropriately allocate the call No. to the MS.

FIG. 5 illustrates an example of the active session management table 20072 of the ASN-GW. The active session management table stores call No. and MS information (MS_Info.) with respect to the active index. The MS information (MS_Info.) appropriately includes MS identification information on the MS and/or the user such as an address, for example, an IP address of the MS, and the terminal identifier, information related to radio communication, connection, and sequence, security information (cryptographic parameter), service flow (SF) information (identification information on a service flow or a path, identification information such as video, audio, or data), and QoS information. The MS information is set for each connection of the BS and the MS, and retained till a next connection. The ASN-GW can appropriately acquire the MS information for the MS in a state where the MS is connected to the BS (active).

FIG. 6 illustrates an example of the idle session management table 20073 of the ASN-GW. The idle session management table stores the call No. and the paging information (paging info.) with respect to the idle index. The paging information appropriately includes the position information on the MS used for, for example, paging. The paging information is information set for each migration of the MS to the idle state, and held till a next migration to the active state. The ASN-GW can appropriately store the paging information for the MS in a state where the MS is not connected to the BS (idle).

FIG. 7 illustrates an example of the MS information storage table 10061 in the MS information storage device. The MS information storage table stores the call No. and the MS information (MS_Info.) with respect to the ext. index. The MS information (MS_Info.) is identical with that in FIG. 5. When migrating from the active state to the idle state, the MS information storage device can appropriately receive the MS information for the MSID, and acquire the MS information. On the other hand, when migrating from the idle state to the active state, the MS information storage device can appropriately transmit the MS information for the MSID to the ASN-GW.

2. Migration Processing from Active State to Idle State

Subsequently, a description will be given of a connection sequence according to this embodiment.

Figure 8:
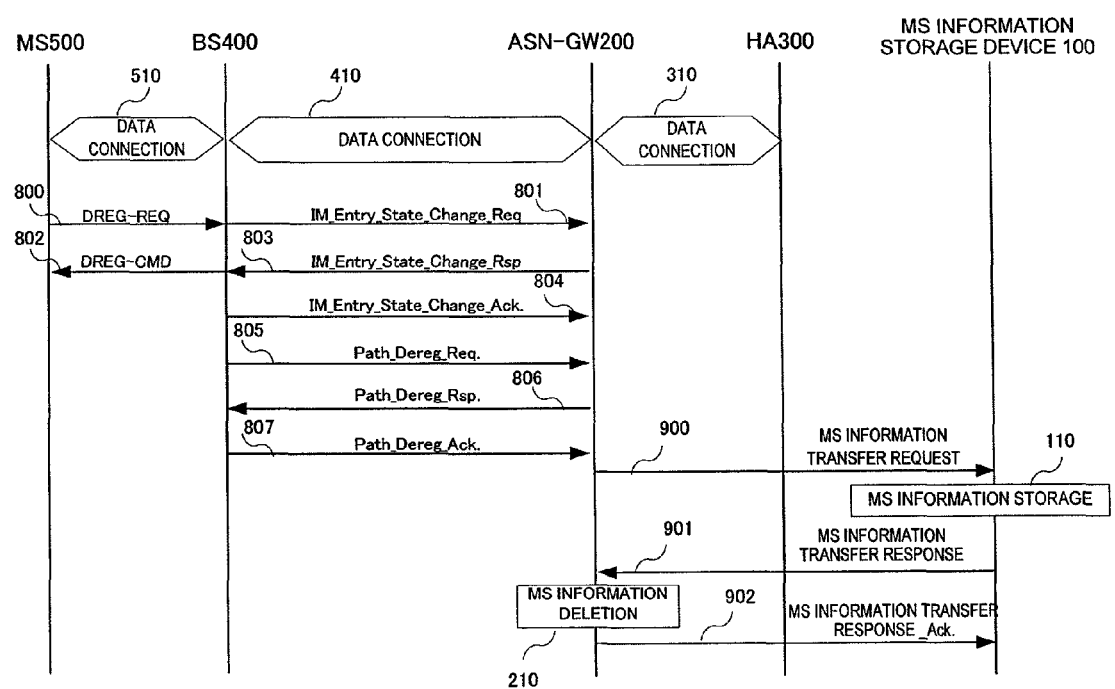
FIG. 8 is a diagram illustrating an idle migration sequence of the mobile communication system according to the embodiment of the present invention.

FIG. 8 is a diagram illustrating an idle migration sequence of the mobile communication system according to the embodiment of the present invention.

The MS 500, the BS 400, the ASN-GW 200, and the HA 300 transfer messages to each other according to a rule. The radio path 510 is established between the MS 500 and the BS 400. The path 410 such as a generic routing encapsulation (GRE) capsuling path is established between the BS 400 and the ASN-GW 200. Also, the path 310 is established between the ASN-GW 200 and the HA 300. With those paths, the data connection is conducted. When the MS 500 requests deletion (idle migration) of the MS information, the MS 500 transmits a delete request (DREG-REQ 800) to the BS 400. As a result, the BS 400 transmits an idle mode entry state change request (IM_Entry_State_Change_Req. 801) to the ASN-GW 200, and thereafter the messages are transferred according to the rule, and executed (IM_Entry_State_Change_Rsp. 803, DREG-CMD 802, IM_Entry_State_Change_Ack. 804, Path_Dereg_Req. 805, 8Path_Dereg_Rsp. 806, Path_Dereg_Ack. 807).

As a result, the radio path 510 of the data connection between the MS 500 and the BS 400, and the path 410 of the data connection between the BS 400 and the ASN-GW 200 are disconnected. The path 310 of the data connection between the HA 300 and the ASN-GW 200 is not disconnected.

Thereafter, the ASN-GW 200 transmits an MS information transfer request 900 including the MS information to the MS information storage device 100. The MS information storage device 100 stores the MS information included in the received MS information transfer request 900 in the MS information storage table (110), and transmits an MS information transfer response 901 to the ASN-GW 200. The ASN-GW 200 receives the MS information transfer response 901, deletes appropriate MS information from the active session management table (210), and transmits an MS information transfer response _Ack. 902 to the MS information storage device 100. The MS information storage device 100 receives the MS information transfer response _Ack. 902.

Figure 12:
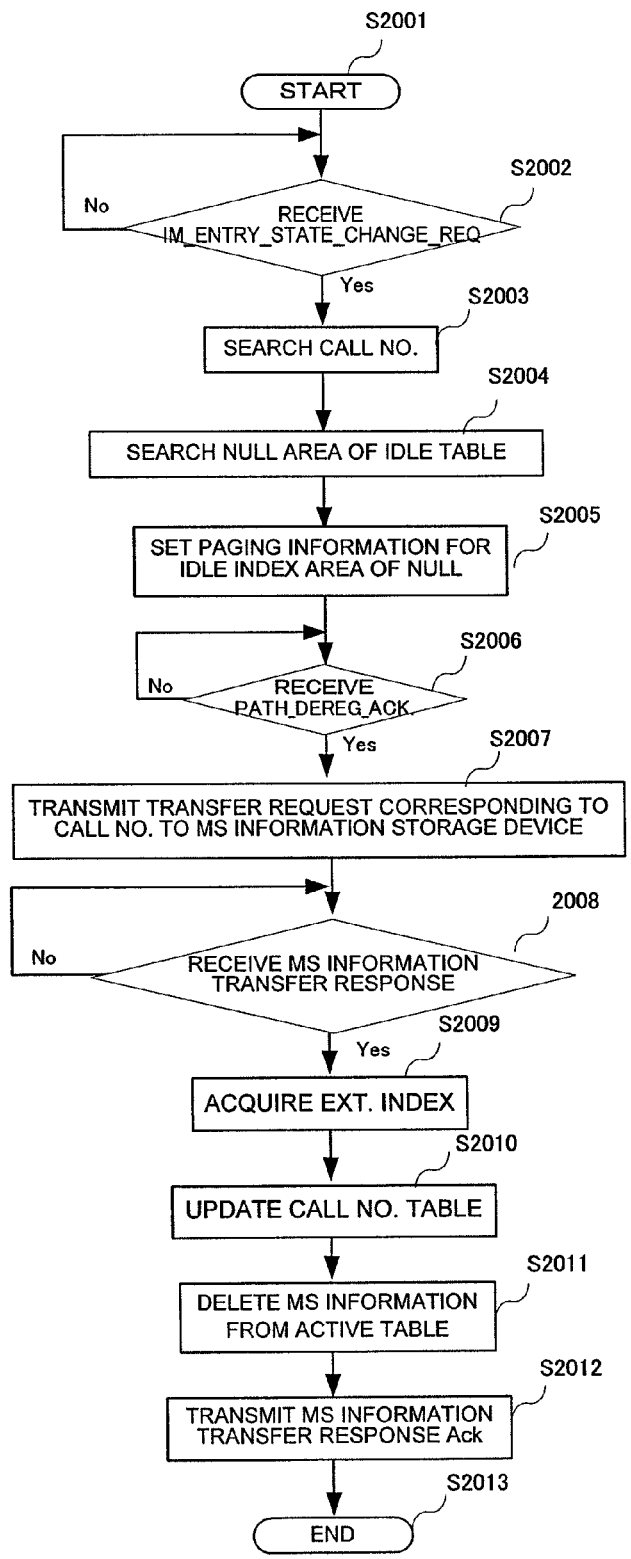
FIG. 12 is a flowchart illustrating idle migration processing of the ASN-GW according to the embodiment of the present invention.

FIG. 12 is a flowchart illustrating idle migration processing of the ASN-GW according to the embodiment of the present invention. This flowchart corresponds to the idle migration sequence of the mobile communication system illustrated in FIG. 8. The ASN-GW 200 executes the following processing in the above-mentioned idle migration sequence (delete sequence).

When the MS 500 requests the deletion (idle migration) of the MS information, the MS 500 transmits a delete request (DREG-REQ 800) including the MSID to the BS 400, and the BS 400 transmits IM_Entry_State_Change_Req including the MSID to the ASN-GW 200. Upon receiving IM_Entry_State_Change_Req (S2002), the ASN-GW 200 searches the call No. on the basis of the MSID included in the IM_Entry_State_Change_Req with reference to the call session management table (S2003). In Step S2002, unless the ASN-GW 200 can receive IM_Entry_State_Change_Req, and Step S2002 is repeated for a given time or by a given number of times.

An example in which call No. is "1", and the MSID is "000001" in FIG. 4 will be described.

The ASN-GW 200 searches an area in which the paging information of the idle session management table is null (S2004). The ASN-GW 200 sets the paging information for the MS 500, and stores the paging information in the searched idle index area of null (S2005).

FIG. 27 illustrates an example of the idle session management table after migration from the active state to the idle state.

An example in which when an area of the idle index "3" is searched in FIG. 6, the paging information is stored in that area will be described.

Subsequently, when the ASN-GW 200 receives Path_Dereg_Ack. From the BS 400 (S2006), the ASN-GW 200 refers to the call session management table, and searches the MS information with reference to the call session management table on the basis of the active index corresponding to the call No., and transmits the MS information transfer request including the MS information corresponding to the call No. to the MS information storage device 100 (S2007). If the ASN-GW 200 cannot receive the Path_Dereg_Ack., Step S2006 is repeated.

As an example, the MS information where the active index is "1" and the call No. is "1" in FIG. 5 is searched.

On the other hand, when the MS information storage device 100 receives the MS information transfer request from the ASN-GW 200, the MS information storage device 100 searches an area in which the MS information is null with reference to the MS information storage table, stores the MS information included in the MS information transfer request in the searched area, and transfers the MS information transfer response including the corresponding ext. index to the ASN-GW 200.

FIG. 28 illustrates an example of the MS information storage table after migration from the active state to the idle state. As an example, as illustrated in FIG. 28, the MS information is stored in correspondence with the ext. index "10".

When the ASN-GW 200 receives the MS information transfer response including the ext. index from the MS information storage device 100 (S2008), the ASN-GW 200 acquires the ext. index included in the MS information transfer response (S2009). If the ASN-GW 200 cannot receive the MS information transfer response, the ASN-GW 200 repeats Step S2008 for a given time or by a given number of times. Then, the ASN-GW 200 updates a call message management table (S2010). In this example, the ASN-GW 200 changes the state from active to idle for the call No. and the MSID, sets null for the active index, sets the idle index of the area in which the paging information is stored in the idle session management table for the idle index, and sets the ext. index included in the MS information transfer response for the ext. index.

FIG. 29 illustrates an example of the call session management table after migration from the active state to the idle state.

As an example, the respective information is set in correspondence with call No. "1" and the MSID "000001".

The ASN-GW 200 deletes the call No. and the MS information corresponding to the call No. from the active session management table (S2011). Then, the ASN-GW 200 transmits an MS information transfer response Ack to the MS information storage device 100 in order to notify the deletion of the MS information (S2012).

FIG. 30 illustrates an example of the active session management table after migration from the active state to the idle state.

3. Migration Processing from Idle State to Active State 3.1. Migration Processing to Active State by ASN-GW 200

Figure 9:
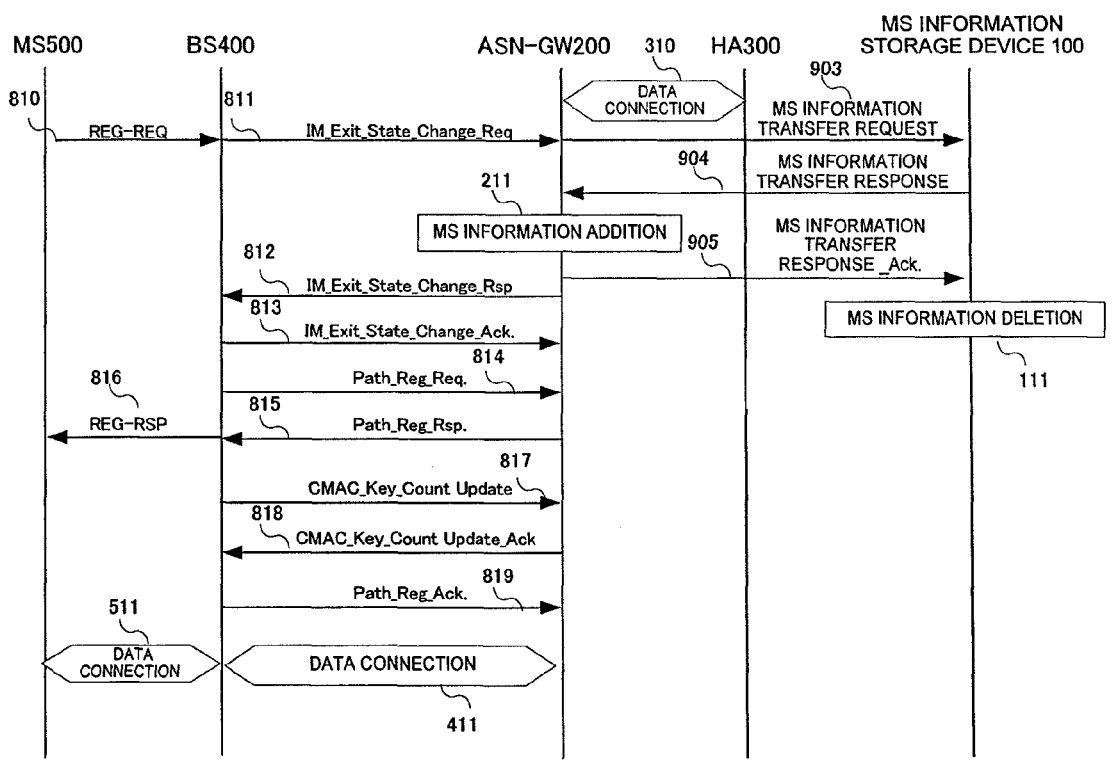
FIG. 9 is a diagram illustrating an active migration sequence of the mobile communication system according to the embodiment of the present invention.

FIG. 9 is a diagram illustrating an active migration sequence of the mobile communication system according to the embodiment of the present invention.

The path 310 is established between the ASN-GW 200 and the HA 300 to conduct the data connection. When the MS 500 requests the registration (migration to active state) of the MS information, the MS 500 transmits a registration request (REG-REQ 810) to the BS400 whereby the BS 400 transmits an idle mode exit state change request (IM_Exit_State_Change_Req. 811) to the ASN-GW 200.

Thereafter, the ASN-GW 200 transmits an MS information transfer request 903 including the ext. index corresponding to the MSID to the MS information storage device 100 in order to acquire the MS information. The MS information storage device 100 searches the MS information from the ext. index included in the received MS information transfer request 903 with reference to the MS information storage table, and transmits an MS information transfer response 904 including the searched MS information and the ext. index to the ASN-GW 200. The ASN-GW 200 transmits the MS information transfer response 904, registers and adds appropriate MS information in the active session management table according to the ext. index (211), and transmits an MS information transfer response _Ack. 905 to the MS information storage device 100. The MS information storage device 100 receives the MS information transfer response _Ack. 905, and deletes the MS information (111).

Thereafter, the messages are transferred according to the rule to conduct the active migration sequence (registration sequence) (IM_Exit_State_Change_Rsp. 812, IM_Exit_State_Change_Ack. 813, Path_Dereg_Req. 814, Path_Dereg_Rsp. 815, REG_Rsp 816, CMAC_Key_Count_Update 817, CMAC_Key_Count_Update_Ack. 818, Path_Dereg_Ack. 819). As a result, the ASN-GW 200 registers the MS information. Also, the MS 500, the BS 400, the ASN-GW 200, and the HA 300 transfer the messages to each other according to the rule. A radio path 511 is established between the MS 500 and the BS 400, and a path 411 such as a generic routing encapsulation (GRE) capsuling path is established between the BS 400 and the ASN-GW 200 to conduct the data connection.

Figure 13:
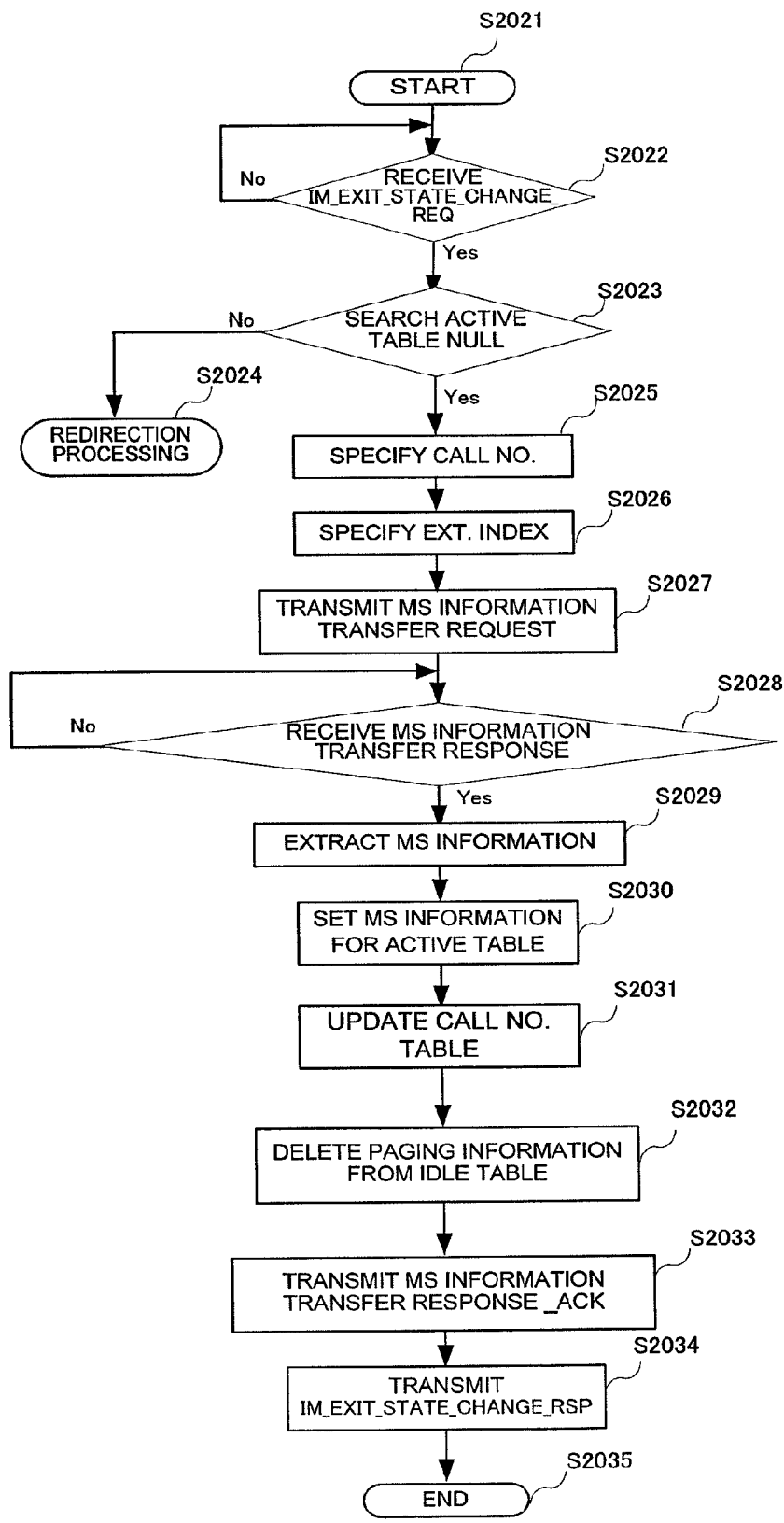
FIG. 13 is a flowchart illustrating active migration processing of the ASN-GW according to the embodiment of the present invention.

FIG. 13 illustrates a flowchart of the active migration processing of the ASN-GW according to the embodiment of the present invention. This flowchart corresponds to the active migration sequence of the mobile communication system illustrated in FIG. 9. The ASN-GW 200 executes the following processing in the above-mentioned active migration sequence (registration sequence).

When the MS 500 requests the registration (migration to the active state) of the MS information, the MS 500 transmits the registration request (REG-REQ 810) including the MSID to the BS400 whereby the BS 400 transmits the idle mode exit state change request (IM_Exit_State_Change_Req. 811) to the ASN-GW 200.

An example in which the MSID is "000001" will be described.

When the ASN-GW 200 receives IM_Exit_State_Change_Req (S2022), the ASN-GW 200 searches the area in which the MS information is null with reference to the active session management table, and obtains the active index (S2023). If the ASN-GW 200 cannot receive the IM_Exit_State_Change_Req, the ASN-GW 200 repeats Step S2022 for a given time or by a given number of times.

On the other hand, if the ASN-GW 200 cannot search the area of null in the active session management table in Step S2023, the ASN-GW 200 processes redirection which will be described later (S2024).

As an example, it is assumed that the MSID is "000001", and the respective tables are the contents of the call session management table in FIG. 29, the active session management table in FIG. 30, the idle session management table in FIG. 27, and the MS information storage table in FIG. 28.

An example in which the active index "1" is searched in FIG. 30 will be described.

In Step S2023, if the area of null can be searched in the active session management table, the ASN-GW 200 acquires the call No. on the basis of the MSID with reference to the call session management table (S2025). In this example, since the MSID is "000001" in FIG. 29, the call No. "1" is specified. Also, the ASN-GW 200 acquires the ext. index on the basis of the MSID with reference to the call session management table (S2026). Then, the ASN-GW 200 transmits the MS information transfer request including the acquired ext. index to the MS information storage device 100 (S2027).

In this example, since the MSID is "000001" in FIG. 29, the ext. index "10" is searched.

On the other hand, when the MS information storage device 100 receives the MS information transfer request including the ext. index from the ASN-GW 200, the MS information storage device 100 searches the MS information for the ext. index with reference to the MS information storage table, and transmits the MS information transfer response including the ext. index and the MS information to the ASN-GW 200.

As an example, the MS information corresponding to the ext. index "10" is searched in FIG. 28.

When the ASN-GW 200 receives the MS information transfer response including the ext. index and the MS information from the MS information storage device 100 (S2028), the ASN-GW 200 extracts the MS information from the MS information transfer response (S2029). If the ASN-GW 200 cannot receive the MS information transfer response, the ASN-GW 200 repeats Step S2028 for a given time or by a given number of times. Then, the ASN-GW 200 sets the call No. specified in Step S2025 and the MS information extracted in Step S2029 in the active session management table in correspondence with the active index obtained in Step S2023 of the active session management table (S2030).

FIG. 31 illustrates an example of the active session management table after migration from the idle state to the active state.

An example in which the area of the active index "1" is set will be described.

Then, the ASN-GW 200 updates the call session management table (S2031). In this example, the ASN-GW 200 changes the state from idle to active for the call No. and the MSID, sets the active index, sets null for the idle index, and sets null for the ext. index.

FIG. 32 illustrates an example of the call session management table after migration from the idle state to the active state. As an example, the respective information is set in correspondence with the call No. "1", and the MSID "000001".

Also, the ASN-GW 200 deletes the paging information corresponding to the call No. from the idle session management table (S2032).

FIG. 33 illustrates an example of the idle session management table after migration from the idle state to the active state. As an example, the paging information corresponding to the call No. "1" and the idle index "3" in FIG. 27 is deleted.

Thereafter, the ASN-GW 200 transmits the MS information transfer response _Ack to the MS information storage device 100 in order to notify the MS information storage device 100 of the migration of the MS information (S2033). On the other hand, the MS information storage device 100 deletes the transferred MS information from the MS information storage table. Also, the ASN-GW 200 transmits IM_Exit_State_Change_Rsp to the BS 400 (S2034). FIG. 34 illustrates an example of the MS information storage table after migration from the idle state to the active state. In this example, the MS information corresponding to the ext. index "10" is deleted.

3.2. Migration Processing to Active State by ASN-GW 201 (Redirection Processing)

Figure 11:
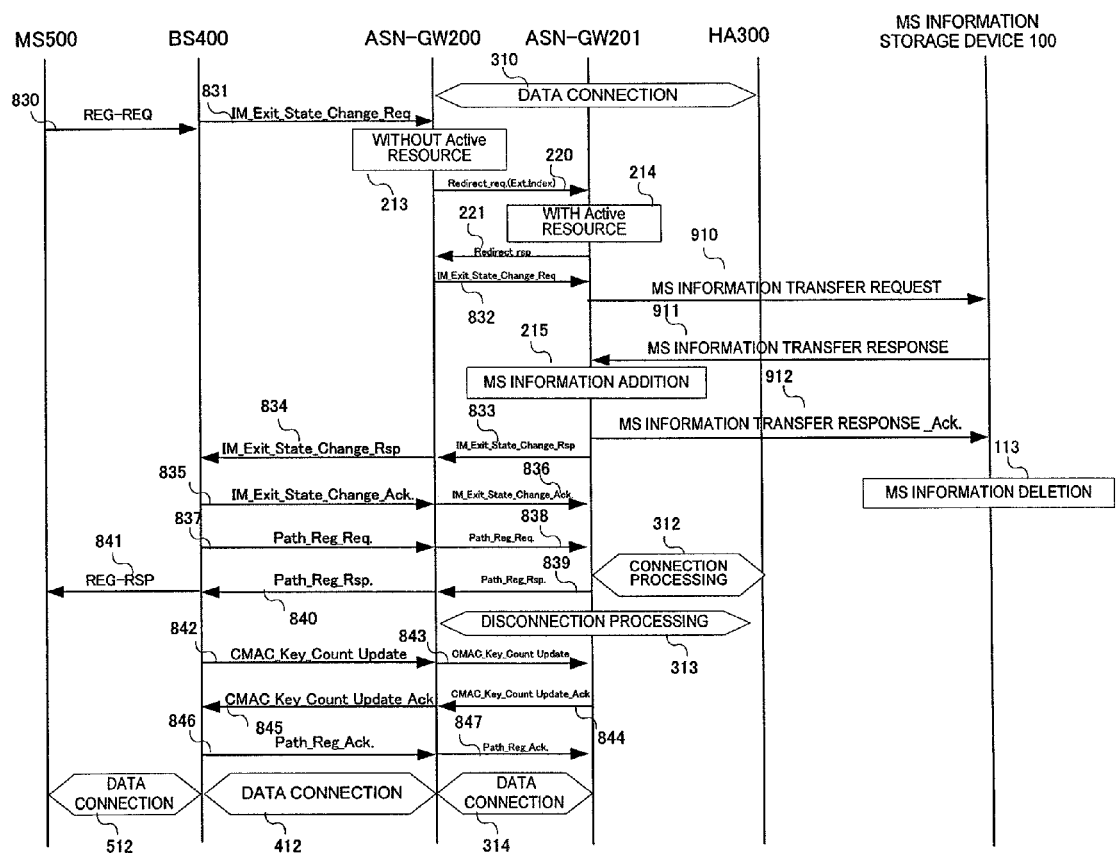
FIG. 11 is a diagram illustrating a redirection sequence in the mobile communication system according to the embodiment of the present invention.

FIG. 11 is a diagram illustrating a redirection sequence in the mobile communication system according to the embodiment of the present invention.

The path 310 is established between the ASN-GW 200 and the HA 300 to conduct the data connection. When the MS 500 requests the registration (migration to active state) of the MS information, the MS 500 transmits the registration request (REG-REQ 830) to the BS 400, whereby the BS 400 transmits an idle mode exit state change request (IM_Exit_State_Change_Req. 831) to the ASN-GW 200.

The ASN-GW 200 determines whether an active resource is present, or not, with reference to the active session management table. If there is no blank in the table (213), the ASN-GW 200 transmits Redirect_req. 220 including the MSID and the ext. index corresponding to the MSID to another ASN-GW 201. When the ASN-GW 201 receives the Redirect_req. 220, the ASN-GW 201 determines whether the active resource is present, or not, with reference to the active session management table of the subject device. If there is a blank in the table (214), the ASN-GW 201 transmits Redirect_rsp. 221. When the ASN-GW 200 receives the Redirect_rsp. 221, the ASN-GW 200 transmits IM_Exit_State_Change_Req. 832.

When the ASN-GW 201 receives the IM_Exit_State_Change_Req. 832, the ASN-GW 201 transmits an MS information transfer request 910 including the ext. index corresponding to the MSID to the MS information storage device 100 in order to acquire the MS information. The MS information storage device 100 searches the MS information from the ext. index included in the received MS information transfer request 910 with reference to the MS information storage table. Then, the MS information storage device 100 transmits an MS information transfer response 911 including the searched MS information and the ext. index to the ASN-GW 200. The ASN-GW 200 receives the MS information transfer response 911, and registers and adds the appropriate MS information in the active session management table according to the ext. index (215), and transmits an MS information transfer response _Ack. 912 to the MS information storage device 100. The MS information storage device 100 receives the MS information transfer response _Ack. 912, and deletes the MS information (113).

Thereafter, messages are transferred among the ASN-GW 201, the ASN-GW 200, the BS 400, and the MS 500 according to the rule to conduct the active migration sequence (registration sequence) (IM_Exit_State_Change_Rsp. 833, 834, IM_Exit_State_Change_Ack. 835, 836, Path_Dereg_Req. 837, 838, connection processing (312), Path_Dereg_Rsp. 839, 840, REG-RSP841, CMAC_Key_Count_Update 842, 843, CMAC_Key_Count_Update_Ack. 844, 845, Path_Dereg_Ack. 846, 847).

As a result, the ASN-GW 201 registers the MS information. Also, a path 312 is established between the ASN-GW 201 and the HA 300 to conduct the data connection. On the other hand, disconnection processing is executed on the path between the ASN-GW 200 and the HA 300 (313). Further, the MS 500, the BS 400, the ASN-GW 200, and the HA 300 transfer the messages to each other according to the rule, and a radio path 512 is established between the MS 500 and the BS 400. A path 412 such as a generic routing encapsulation (GRE) capsuling path is established between the BS 400 and the ASN-GW 200, and a path 314 is established between the ASN-GW 200 and the ASN-GW 201 to conduct the data connection. That is, the data connection is conducted in a route of the MS 500, the BS 400, the ASN-GW 200, the ASN-GW 201, the HA 300, and the network 700.

Figure 14:
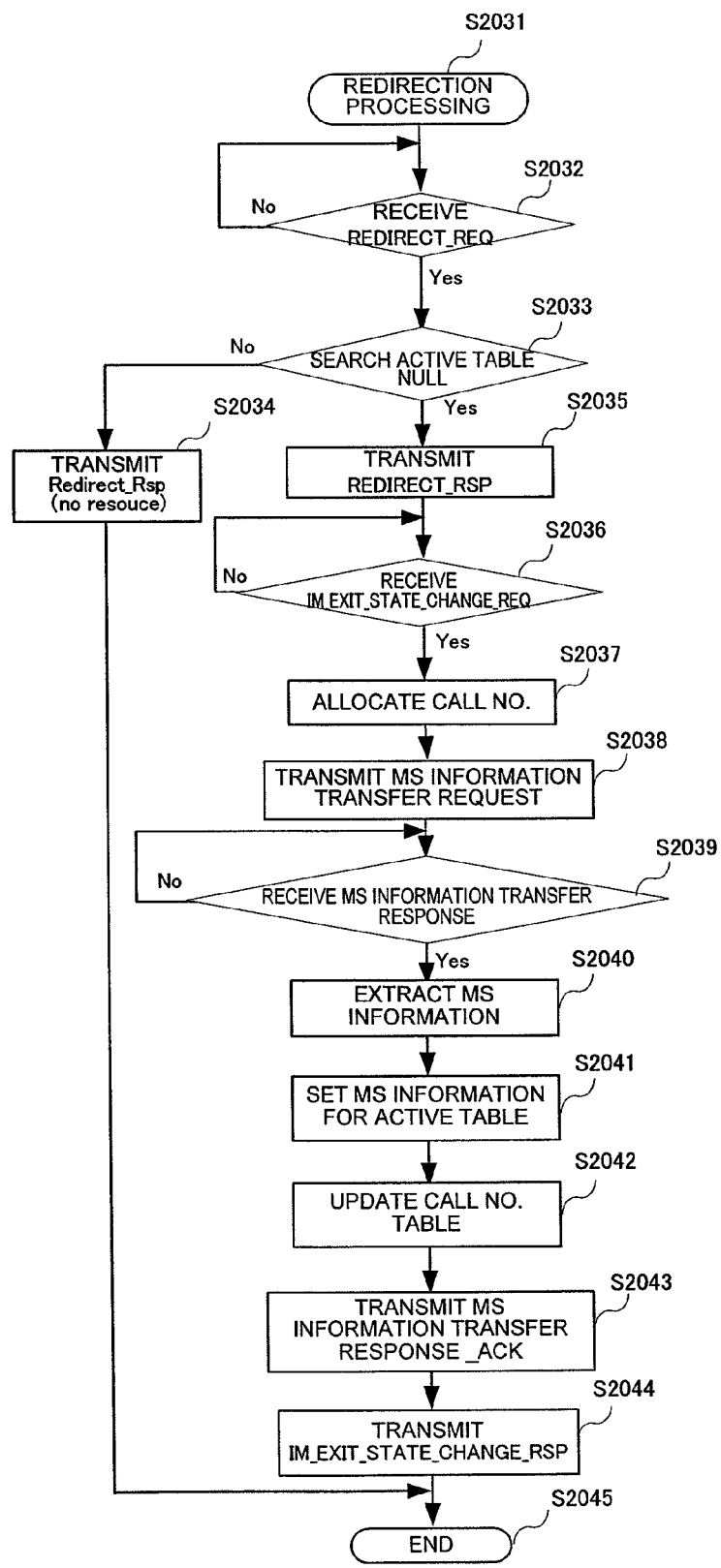
FIG. 14 is a flowchart illustrating redirection processing of the ASN-GW according to the embodiment of the present invention.

FIG. 14 illustrates a flowchart of the redirection processing of the ASN-GW according to the embodiment of the present invention. This flowchart corresponds to the redirection sequence of the mobile communication system illustrated in FIG. 11.

The ASN-GW 200 searches the active session management table in Step S2023 of FIG. 13, and executes the following redirection processing if the area of null is absent (S2031). First, the ASN-GW 200 transmits Redirect_Req including the MSID and the ext. index to the ASN-GW 201. In this situation, a destination ASN-GW may determine a selection order in advance, or determine the selection order at random. When the ASN-GW 201 receives the Redirect_Req from the ASN-GW 200 (S2032), the ASN-GW 201 searches the area in which the MS information is null with reference to the active session management table, and obtains the active index (S2033). If the ASN-GW 201 cannot receive the Redirect_Req, the ASN-GW 201 repeats Step S2032 for a given time or by a given number of times. If the ASN-GW 201 can search the area of null in the active session management table in Step S2033, the ASN-GW 201 transmits Redirect_Rsp for notifying the ASN-GW 200 that the resource is present to the ASN-GW 200 (S2035). Also, if the area of null cannot be searched in the active session management table in Step S2033, the ASN-GW 201 transmits Redirect_Rsp (no resource) for notifying the ASN-GW 200 that the resource is absent to the ASN-GW 200 (S2034), and finishes the processing.

On the other hand, when the ASN-GW 200 receives Redirect_Rsp for notifying the ASN-GW 200 that the resource is present from the ASN-GW 201, the ASN-GW 200 transmits the idle mode exit state change request (IM_Exit_State_Change_Req.) including the MSID to the ASN-GW 201.

When the ASN-GW 201 receives the IM_Exit_State_Change_Req (S2036), the ASN-GW 201 allocates an available call No. in an appropriate order or method (S2037). If the ASN-GW 201 cannot receive the IM_Exit_State_Change_Req, the ASN-GW 201 repeats Step S2036 for a given time or by a given number of times. Then, the ASN-GW 201 transmits the MS information transfer request including the ext. Index acquired in Step S2032 to the MS information storage device 100 (S2038).

On the other hand, when the MS information storage device 100 receives the MS information transfer request including the ext. index from the ASN-GW 201, the MS information storage device 100 searches the MS information for the ext. index with reference to the MS information storage table, and transmits the MS information transfer response including the ext. index and the MS information to the ASN-GW 201.

When the ASN-GW 201 receives the MS information transfer response including the ext. index and the MS information from the MS information storage device 100 (S2039), the ASN-GW 201 extracts the MS information from the MS information transfer response (S2040). If the ASN-GW 201 cannot receive the MS information transfer response, the ASN-GW 201 repeats Step S2028 for a given time or by a given number of times. Then, the ASN-GW 201 sets the call No. allocated in Step S2037 and the MS information extracted in Step S2040 in correspondence with the active index obtained in Step S2033 of the active session management table (S2041).

Then, the ASN-GW 201 updates the call No. table (S2042). The ASN-GW 201 sets the MSID acquired in Step S2032 for the call No. allocated in Step S2037, sets the state to active, sets the active index acquired in Step S2033 for active index, sets null for the idle index, and sets null for the ext. index.

Thereafter, the ASN-GW 201 transmits the MS information transfer response _Ack for notifying the MS information storage device 100 of the migration of the MS information to the MS information storage device 100 (S2043). On the other hand, the MS information storage device 100 deletes the transferred MS information from the MS information storage table. Also, the ASN-GW 201 transmits IM_Exit_State_Change_Rsp to the ASN-GW 200 (S2044).

4. Disconnection Processing

Figure 10:
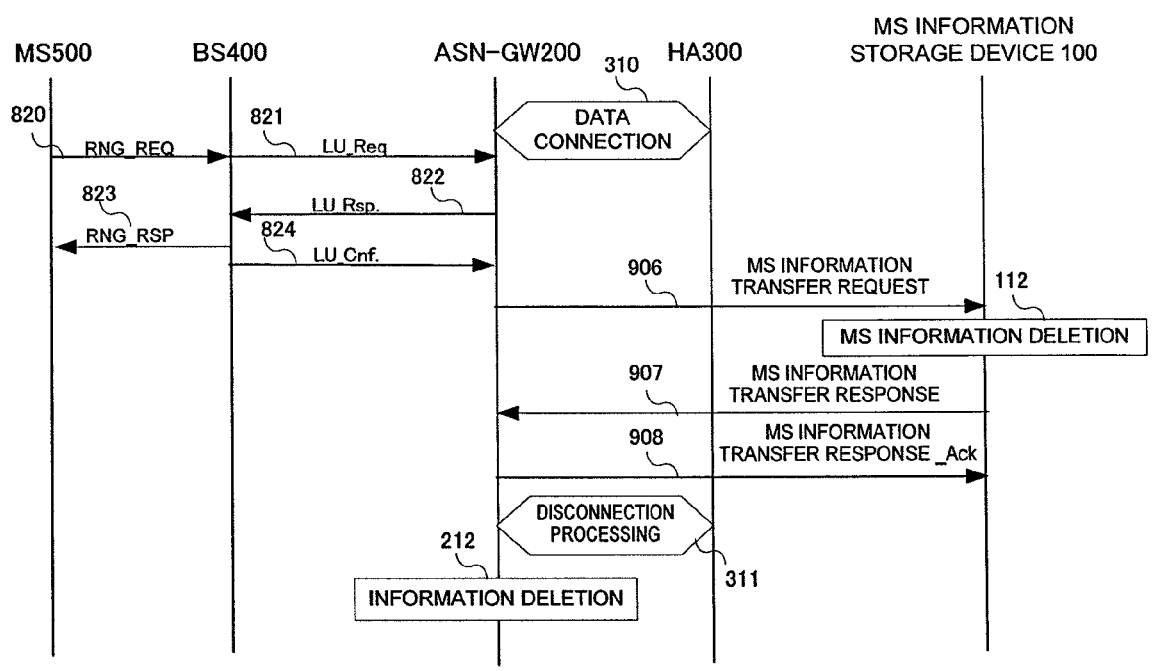
FIG. 10 is a diagram illustrating a disconnection sequence in the mobile communication system according to the embodiment of the present invention.

FIG. 10 illustrates a disconnection sequence from the idle state in the mobile communication system according to the embodiment of the present invention.

Subsequently, the disconnection sequence will be described.

The path 310 is established between the ASN-GW 200 and the HA 300 to conduct the data connection. When the data connection is disconnected, the MS 500 transmits an RNG-REQ 820 which is a delete request to the BS 400. The BS 400 executes a disconnection sequence between the BS 400 and the ASN-GW 200 upon receiving an RNG-REQ 820 (LU_Req. 821, LU_Rsq. 822, RNG-RSP 823, LU_Cnf. 824).

Thereafter, the ASN-GW 200 transmits an MS information transfer request 906 including the ext. index corresponding to the MSID to the MS information storage device 100 in order to delete the MS information. The MS information storage device 100 deletes the MS information corresponding to the ext. index included in the received MS information transfer request 903 with reference to the MS information storage table, and transmits an MS information transfer response 907 to the ASN-GW 200. When the ASN-GW 200 receives the MS information transfer response 907, the ASN-GW 200 transmits the MS information transfer response _Ack. 905 to the MS information storage device 100. The MS information storage device 100 receives the MS information transfer response _Ack. 905. Also, the ASN-GW 200 executes disconnection processing of the path 310 of the data connection with the HA 300, and deletes the appropriate MS information from the active session management table according to the ext. index (212).

5. Message Format

Figure 15:
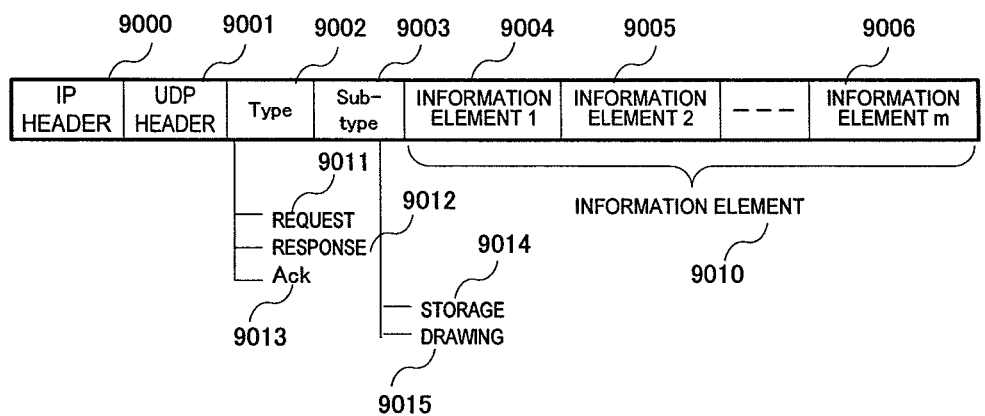
FIG. 15 is a diagram illustrating a request message format to the MS information storage device according to the embodiment of the present invention.

FIG. 15 illustrates an example of a request message format to the MS information storage device according to the embodiment of the present invention.

The request message includes an IP header 9000, an UDP header 9001, a type 9002, a sub-type 9003, and one or a plurality of information elements 9010 (information element 1 9004, information element 1 9005 to information element m 9006). The type 9002 is used for distinguishing a request 9011, a response 9012, and an acknowledgement (Ack) 9013. The sub-type 9003 is used for distinguishing a storage 9014 and a drawing 9015. The information element 9010 includes information such as the MSID, the MS information, and the ext. index, which are transmitted or received between the ASN-GW and the MS information device.

6. Advantages

According to this embodiment, in the mobile system in which the M2M connection and the connection other than the M2M connection are mixed together, the number of required GWs is reduced, and the number of facilities is suppressed by storing MS information on an M2M connection in the external device, and cooperating with the GWs such as mobile GWs.

Also, according to this embodiment, when the storage capacity of the MS information in one GW is short, the MS information can be stored in another GW (redirection).

B. Second Embodiment

Configuration in which the MS Information on the Idle State of the M2M Connection is Stored in the External Device In a second embodiment of the present invention, the BS notifies the ASN-GW whether the terminal is the M2M connection terminal or the terminal other than the M2M connection (connection intervening a person). The ASN-GW stores the MS information determined as the M2M connection in the MS storage information storage device, and stores the MS information determined as the MS information other than the M2M connection in the ASN-GW.

In the second embodiment, the hardware of the system and the respective devices are identical with those in the first embodiment.

Figure 16:
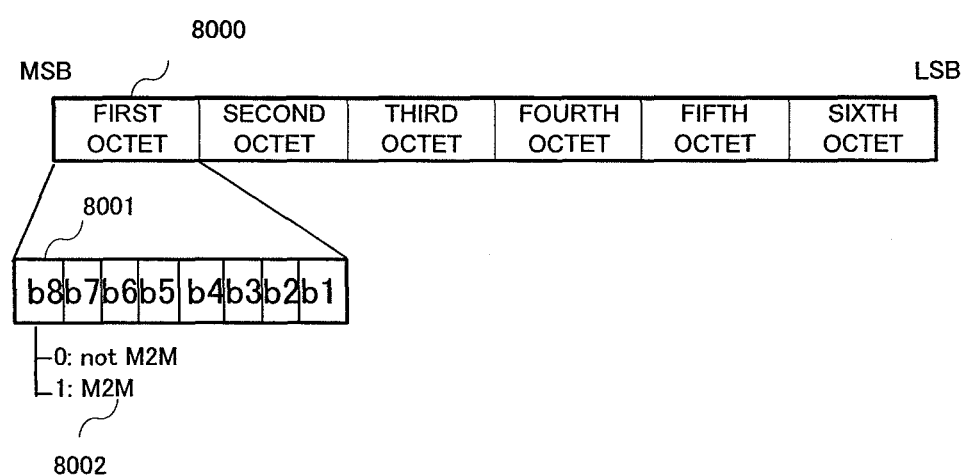
FIG. 16 is a diagram illustrating an MSID format according to a second embodiment of the present invention.

FIG. 16 illustrates an illustrative view of an MSID format according to the second embodiment (example 1) of the present invention.

In FIG. 16, as an example, an MSM identifier 8001 is included in bits b8 of a first octet in an MSID 8000. As an MSM identifier 8001, for example, "0" is set in the connection other than the M2M connection, and "1" (8002) is set in the M2M connection.

In the second embodiment (example 1) of the present invention, an M2M identifier for identifying whether the terminal is the M2M connection terminal or the terminal other than the M2M connection (connection intervening a person) is disposed in a spare bit of the terminal identifier (MSID). The ASN-GW determines whether the connection is the M2M connection, or not, according to the M2M identifier included in the MSID received from the BS. The ASN-GW can store the MS information in the MS storage information storage device if it is determined as the M2M connection, and can store the MS information in the active session management table within the ASN-GW if it is determined as the connection other than the M2M connection.

Figure 17:
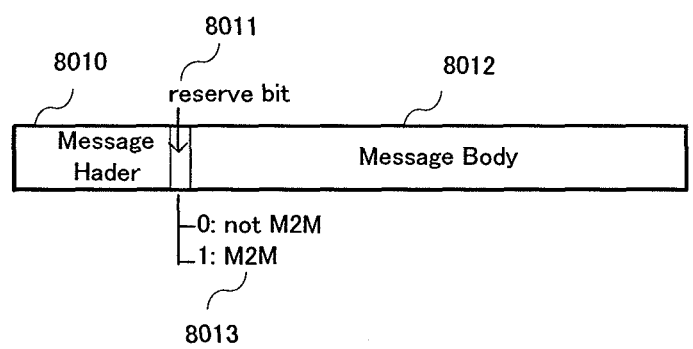
FIG. 17 is a diagram illustrating a signaling format according to the second embodiment of the present invention.

FIG. 17 illustrates a signaling format according to the second embodiment (example 2) of the present invention.

This signaling format includes a header 8010, a reserve bit 8011, and a message 8012. As the reserve bit 8011, for example, "0" is set in the connection other than the M2M connection, and "1" (8013) is set in the M2M connection.

In an example 2 of the second embodiment of the present invention, as another means for determining the M2M connection, the M2M identifier is allocated to the spare bit of the message between the BS and the ASN-GW. In the rule of the radio connection between the MS and the BS, because the BS can recognize whether the MS has the M2M connection, or not, the BS grasps information on the M2M connection/the connection other than M2M connection for each MSID. When the BS determines that the connection of the MS is the M2M connection, the BS allocates the M2M identifier to the spare bit of the message between the BS and the ASN-GW. With the allocation of the M2M identifier, the BS can notify the ASN-GW whether the MS has the M2M connection, or not.

FIG. 18 illustrates an example of the call session management table according to the second embodiment of the present invention. The call session management table stores the MSID, the state, the active index (not M2M index), the idle index, and the ext. index for the call No. When the MS is connected to the BS, the ASN-GW can appropriately allocate the call No. to the MS. The active index includes not M2M index which is an index in the case of no M2M connection.

FIG. 19 illustrates an example of the active session management table according to the second embodiment of the present invention. The active session management table stores the call No. and the MS information (MS_Info.) for the active index (not M2M index). The MS information (MS_Info.) is configured as described above.

In the second embodiment, the example of the idle session management table of the ASN-GW is identical with that in FIG. 6. Also, the example of the MS information storage table in the MS information storage device is identical with that in FIG. 7.

Figure 20:
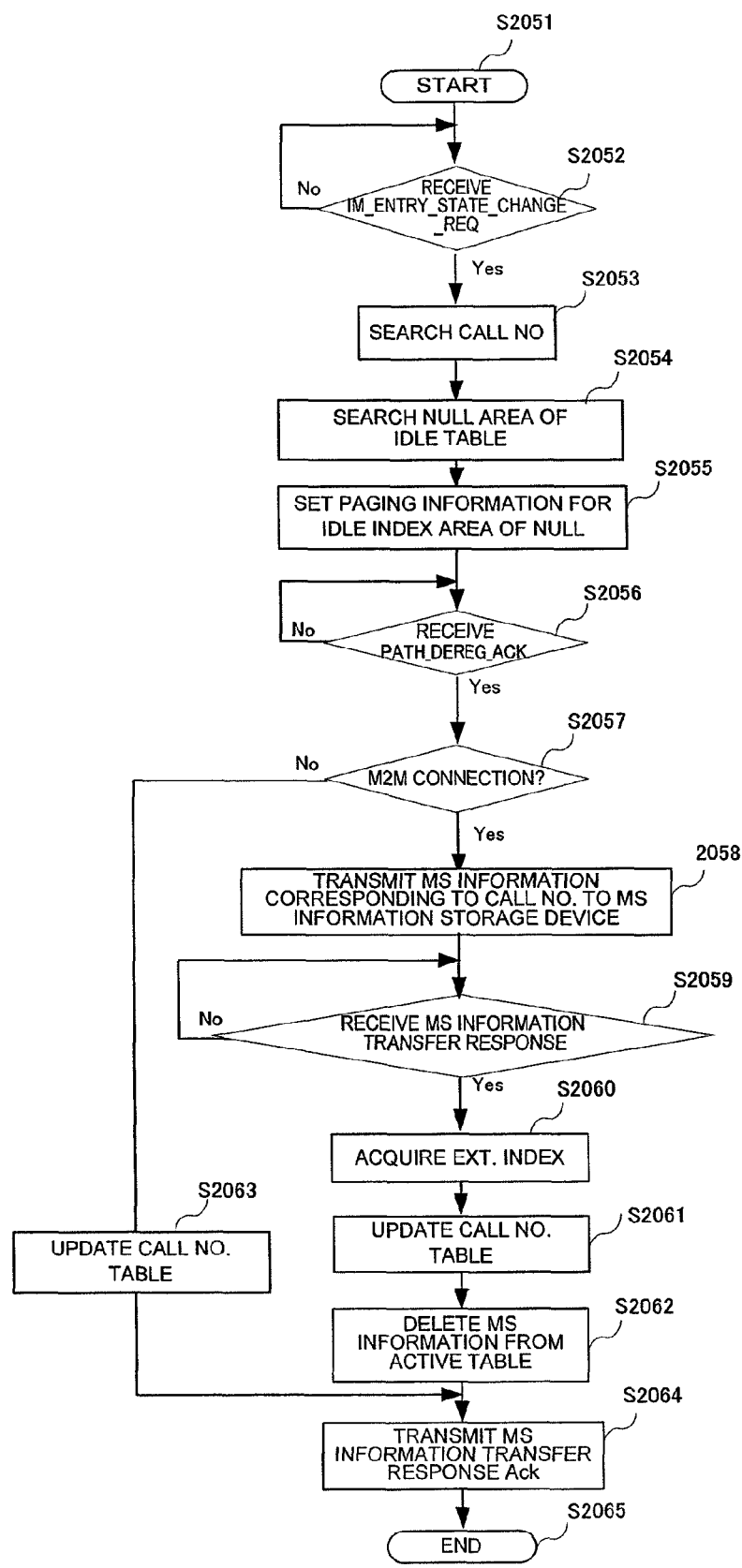
FIG. 20 is a flowchart illustrating idle migration processing in a mobile communication system according to the second embodiment of the present invention.

FIG. 20 is a flowchart illustrating idle migration processing in the mobile communication system according to the second embodiment of the present invention.

The idle migration sequence is identical with that in the first embodiment (FIG. 8).

In the flowchart of FIG. 20, Steps S2051 to S2052 are identical with the respective processing in the first embodiment (Steps S2001 to S2006 in FIG. 12).

Then, in Step S2057, the ASN-GW 200 determines whether the connection is the M2M connection, or not. For example, when the MSID is the above-mentioned MSID illustrated in FIG. 16, the ASN-GW 200 can determine whether the connection is the M2M connection, or not, according to the M2M identifier included in the MSID received from the BS 400. Also, as illustrated in FIG. 17 described above, when the M2M identifier is allocated to the spare bit of the message from the BS 400, the ASN-GW 200 can determine whether the MS has the M2M connection, or not, according to the M2M identifier.

When the connection is the M2M connection, the ASN-GW 200 shifts the processing to Step S2058.

Steps S2058 to S2065 are identical with the respective processing of the first embodiment (Steps S2007 to S2013 in FIG. 12).

On the other hand, when the connection is not the M2M connection, the ASN-GW 200 updates the call session management table (S2063).

Hereinafter, as an example, a case in which the MSID is "00001", and the MS 500 is not M2M will be described.

In this example, the call session management table is illustrated in FIG. 18, the active session management table is illustrated in FIG. 19, and the idle session management table is illustrated in FIG. 6.

Before Step S2056, the processing is executed as described above. In Steps S2054 and S2055, the paging information is set in the null area in the idle session management table.

FIG. 35 illustrates an example of the idle session management table after migration from the active state to the idle state according to the second embodiment.

In Step S2057, since the connection is the M2M connection, the flow proceeds to Step S2063. In Step S2063, the ASN-GW 200 sets the state to idle, sets the not M2M index to "1" as it is, sets the idle index to the idle index "3" in the area of null searched in Step S2054, and sets null for the ext. index, in the call No. "1" corresponding to the MSID "00001" with reference to FIG. 18.

FIG. 36 illustrates an example of the call session management table after migration from the active state to the idle state according to the second embodiment.

The information of the active session management table is held as it is. Also, the MS information storage table is identical with that in the first embodiment.

Figure 21:
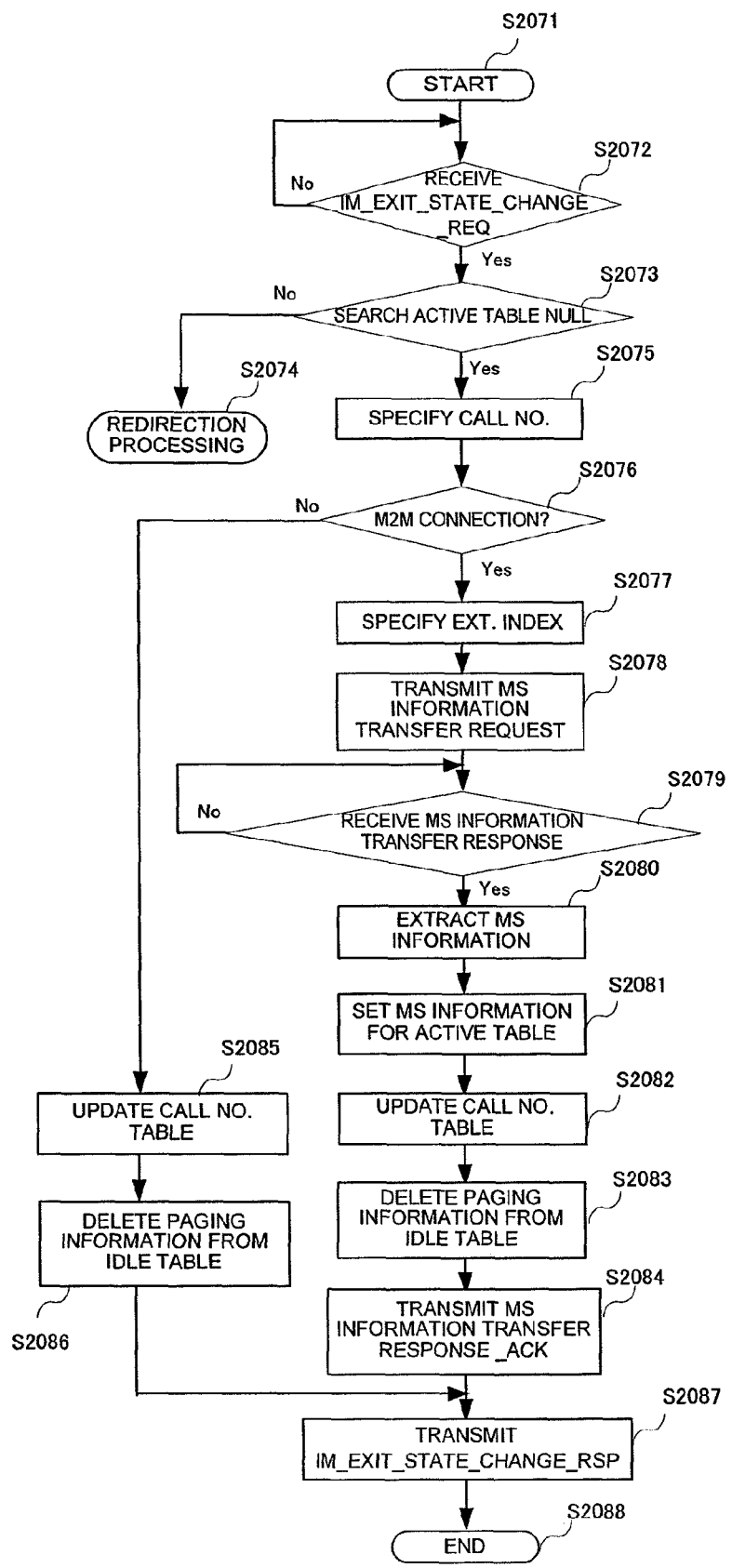
FIG. 21 is a flowchart illustrating active migration processing in the mobile communication system according to the second embodiment of the present invention.
Figure 24:
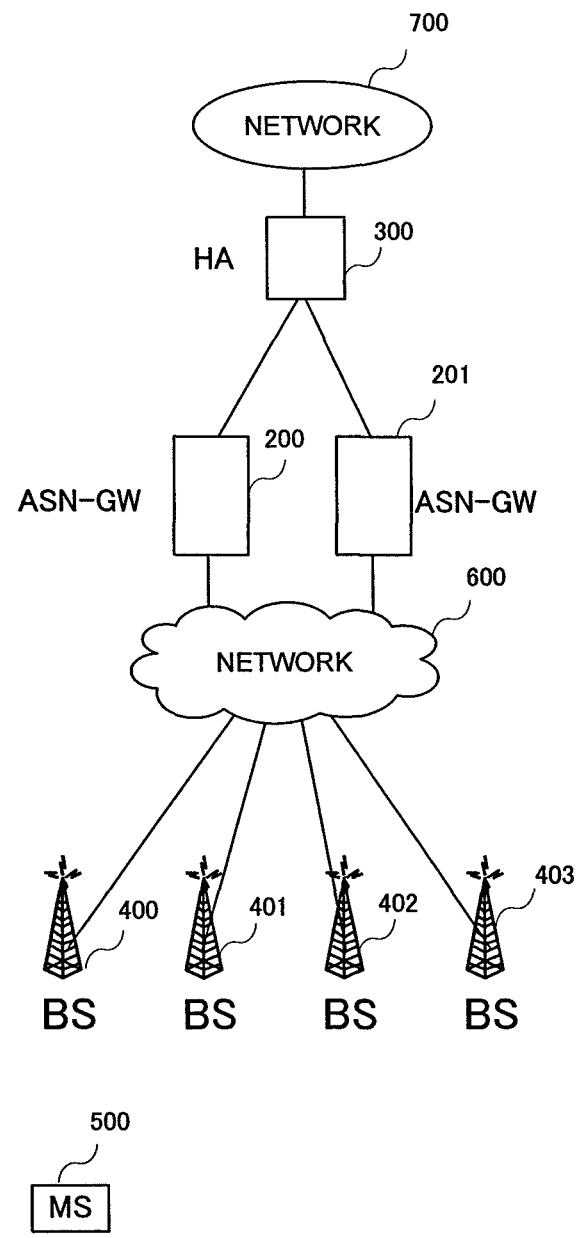
FIG. 24 is a configuration diagram of a mobile communication system in a related art.
Figure 25:
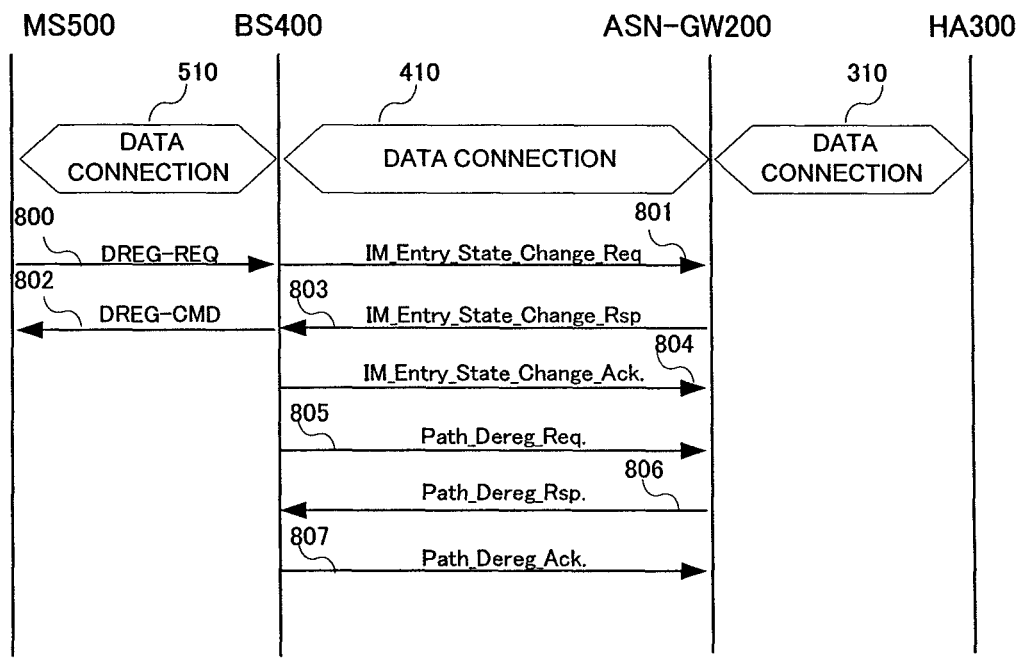
FIG. 25 is a diagram illustrating an idle migration sequence of the mobile communication system in the related art.
Figure 26:
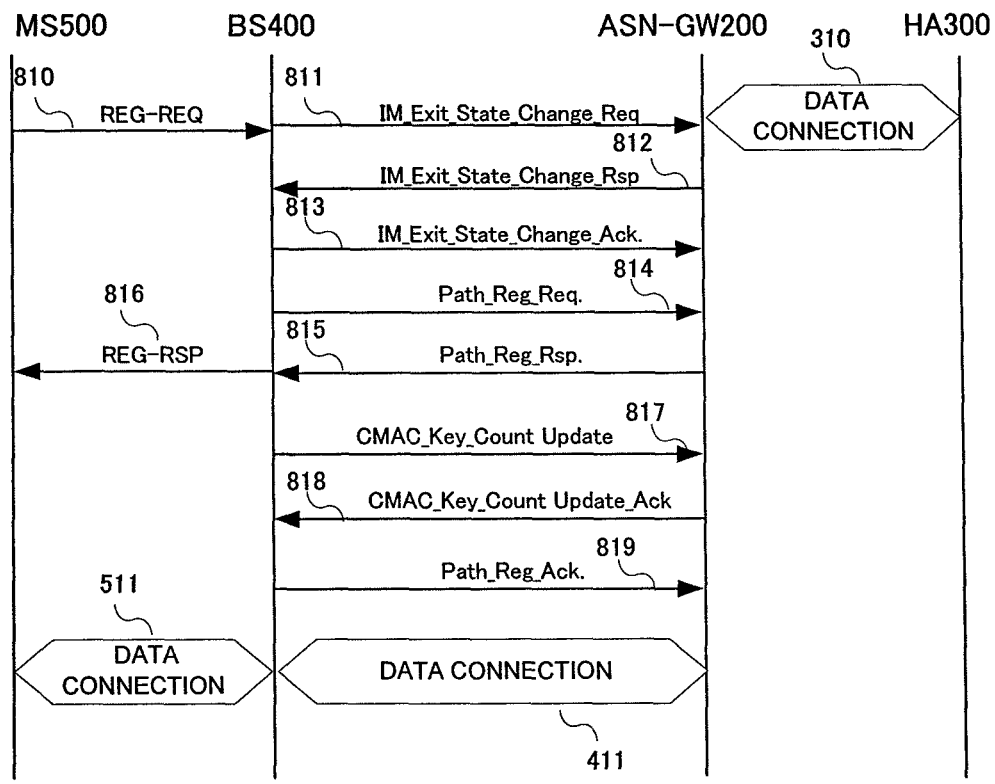
FIG. 26 is a diagram illustrating an active migration sequence of the mobile communication system in the related art.

FIG. 21 is a flowchart illustrating the active migration processing in the mobile communication system according to the second embodiment of the present invention.

The idle migration sequence is identical with that in the first embodiment (FIG. 9).

In the flowchart of FIG. 21, Steps S2071 to S2075 are identical with the respective processing in the first embodiment (Steps S2021 to S2025 in FIG. 12).

Then, in Step S2076, the ASN-GW 200 determines whether the connection is the M2M connection, or not. For example, when the MSID is the above-mentioned MSID illustrated in FIG. 16, the ASN-GW 200 can determine whether the connection is the M2M connection, or not, according to the M2M identifier included in the MSID received from the BS 400. Also, as illustrated in FIG. 17 described above, when the M2M identifier is allocated to the spare bit of the message from the BS 400, the ASN-GW 200 can determine whether the MS has the M2M connection, or not, according to the M2M identifier.

When the connection is the M2M connection, the ASN-GW 200 shifts the processing to Step S2085.

Hereinafter, as an example, a case in which the MSID is "00001", and the MS 500 is not M2M will be described. In this example, the call session management table is illustrated in FIG. 36, the active session management table is illustrated in FIG. 6, and the idle session management table is illustrated in FIG. 35.

Before Step S2075, the processing is executed as described above. In Step S2076, since the connection is the M2M connection, the flow proceeds to Step S2085. In Step S2085, the ASN-GW 200 sets the state to active, sets the active index (not M2M index) to "1" as it is, sets the idle index to null, and sets null for the ext. index, in the call No. "1" corresponding to the MSID "00001" with reference to FIG. 36.

FIG. 37 illustrates an example of the call session management table after migration from the idle state to the active state according to the second embodiment.

Then, in Step S2086, the ASN-GW 200 deletes the paging information from the idle session management table. In FIG. 35, the ASN-GW 200 deletes the paging information corresponding to the idle index "3".

FIG. 38 illustrates an example of the idle session management table after migration from the idle state to the active state according to the second embodiment.

The information of the active session management table is held as it is. Also, the MS information storage table is identical with that in the first embodiment.

According to this embodiment, since the MS information other than the M2M connection is stored within the device, the connection other than the M2M connection can be processed in the same state transition processing time as that in the related art.

C. Third Embodiment

Configuration in which Domain Information is Used for Identification of M2M Connection The MS has the domain information indicative of a service organization to which the terminal belongs. The M2M information can be distinguished by the domain information. For example, when M2M service is applied to a power meter reading of an electric power company, the domain information on the power meter reading is power. corn. The domain information, and the M2M identifier indicative of a distinction of whether the service is an M2M service, or not, for the domain information, are set and stored in the ASN-GW in advance to discriminate whether the MS making a connection request is the M2M connection, or not.

FIG. 22 is a table of the domain set for the ASN-GW in advance.

In the table, the ASN-GW sets the domain information, and the M2M identifier indicating whether the MS belonging to the domain information is the M2M, or not, in advance.

FIG. 23 is a domain information table for managing a correspondence relationship of the MSID, the domain, and whether to provide the M2M service, or not.

When the MS conducts new connection, because the domain information is included in the connection message from the BS, the ASN-GW can create the table of FIG. 23 in advance, with the use of the call No. and the MSID with reference to the table of FIG. 22 upon completion of the connection.

The idle migration processing of the mobile communication system according to the third embodiment is identical with the flowchart of FIG. 20, and the idle migration sequence is identical with that in the first embodiment (FIG. 8).

In Step S2057 in the flowchart of FIG. 20, the ASN-GW 200 searches the table of FIG. 23 with the use of the call No. searched in Step S2053 to determine whether the connection is the M2M connection, or not.

The active migration processing of the mobile communication system according to the third embodiment is identical with that in the flowchart of FIG. 21. Also, the idle migration sequence is identical with that in FIG. 9 of the first embodiment.

In Step S2076 of the flowchart in FIG. 21, the ASN-GW 200 searches the table of FIG. 23 with the use of the call No. specified in Step S2075 to determine whether the connection is the M2M connection, or not.

According to this embodiment, the MS information other than the M2M connection is stored within the device whereby the connection other than the M2M can be processed in the same state transition processing time as that in the related art.

In this embodiment, the ASN-GW has been mainly described. However, the present invention is not limited to the ASN-GW, but can be applied to various GWs, an appropriate router, or computer.

Also, in this embodiment, the Internet has been mainly described. However, the present invention is not limited to the Internet, but can be applied to a variety of networks.

What is claimed is:

1. A radio communication system in which a mobile station (MS) is connected to a network through a base station (BS) to conduct a machine-to-machine (M2M) communication, the radio communication system comprising:
a gateway (GW) disposed between the BS and the network; and
an MS information storage device that transmits and receives MS information with respect to the GW, wherein
the gateway includes:
a call session management table that stores an MSID which is an identifier of the MS, state information indicating whether a session of the MS is in an active state or an idle state, and an external index (ext. index) with respect to a call number (call No.) allocated to the MS when the MS is connected to the BS;
an active session management table that stores the MS information which is information on the MS with the inclusion of an address of the MS with respect to the call No.;
an idle session management table that stores paging information on the MS with respect to the call No.; and
a control unit that executes migration processing between the active state and the idle state,
wherein,
when the MS requests migration from the active state to the idle state,
the gateway receives an idle migration request including an MSID from the BS, and searches the call No. on the basis of the MSID included in the idle migration request with reference to the call session management table,
the gateway searches an area in which the paging information is null with reference to the idle session management table according to the call No., and sets the paging information on the MS for the searched area,
the gateway searches the MS information with reference to the active session management table according to the call No., and transmits a first MS information transfer request including the MS information corresponding to the call No. to the MS information storage device,
when receiving a first MS information transfer response including the ext. index corresponding to the MS information stored in the MS information storage device from the MS information storage device, the gateway acquires the ext. index included in the first MS information transfer response, the gateway changes the state information from the active state to the idle state with respect to the call No. and the MSID, stores the idle state to the state information in the call session management table, and stores the acquired ext. index, and the gateway deletes the call No. and the MS information corresponding to the call No. from the active session management table, whereby the paths for the data connection among the MS, the BS and the gateway are disconnected, and the path for the data connection between the gateway and the network is not disconnected.

2. The radio communication system according to claim 1, wherein the MS information storage device includes an MS information storage table that stores the MS information with respect to the ext. index, and when receiving the first MS information transfer request from the gateway, the MS information storage device searches an area in which the MS information is null with reference to the MS information storage table, stores the MS information included in the first MS information transfer request in the searched area, and transfers the first MS information transfer response including the corresponding ext. index to the gateway.

3. The radio communication system according to claim 1, wherein when the MS requests the migration from the idle state to the active state, upon receiving a first active migration request including the MSID from the BS, the gateway searches an area in which the MS information is null with reference to the active session management table, if the gateway can search the area of null in the active session management table, the gateway acquires the call No. and the ext. index on the basis of the MSID with reference to the call session management table, the gateway transmits a second MS information transfer request including the acquired ext. index to the MS information storage device, when the gateway receives a second MS information transfer response including the ext. index and the MS information from the MS information storage device, the gateway extracts the MS information from the second MS information transfer response, the gateway sets the call No. and the MS information in the active session management table, the gateway changes the state information from the idle state to the active state with respect to the call No. and the MSID, stores the active state to the state information in the call session management table, and set null in the ext. index, the gateway deletes the paging information corresponding to the call No. from the idle session management table, and the gateway transmits an MS information transfer response acknowledgement to the MS information storage device in order to delete the MS information, whereby paths are established among the MS, the BS, the gateway, and the network to conduct data connection.

4. The radio communication system according to claim 3, wherein upon receiving the second MS information transfer request including the ext. index from the gateway, the MS information storage device searches the MS information on the ext. index with reference to the MS information storage table, and transmits the second MS information transfer response including the ext. index and the MS information to the gateway.

5. The radio communication system according to claim 3, wherein if there is no area of null when the gateway searches the active session management table in receiving the first active migration request, the gateway transmits a redirect request including the MSID and the ext. index to an another gateway, upon receiving the redirect request from the gateway, the another gateway searches an area in which the MS information is null with reference to the active session management table of the subject device, and transmits a redirect response for notifying the gateway that a resource is present if the another gateway can search the area of null in the active session management table, upon receiving the redirect response from the another gateway, the gateway transmits a second active migration request including the MSID to the another gateway, upon receiving the second active migration request, the another gateway searches the area in which the MS information is null with reference to the active session management table, if the another gateway can search the area of null in the active session management table, the another gateway acquires the call No. and the ext. index on the basis of the MSID with reference to the call session management table of the subject device, the another gateway transmits a second MS information transfer request including the acquired ext. index to the MS information storage device, when the another gateway receives a second MS information transfer response including the ext. index and the MS information from the MS information storage device, the another gateway extracts the MS information from the second MS information transfer response, the another gateway sets the call No. and the MS information in the active session management table, the another gateway changes the state information from the idle state to the active state with respect to the call No. and the MSID, stores the active state to the state information in the call session management table, and sets null in the ext. index, the another gateway deletes the paging information corresponding to the call No. from the idle session management table of the subject device, and the another gateway transmits an MS information transfer response acknowledgement to the MS information storage device in order to delete the MS information, whereby paths are established among the MS, the BS, the gateway, the another gateway, and the network to conduct the data connection.

6. The radio communication system according to claim 1, wherein the M2M identifier for identifying whether the connection is the M2M connection or the connection other than the M2M connection is included in the MSID, the gateway determines whether the connection is the M2M connection or not, according to the M2M identifier included in the MSID received from the BS, and if it is determined as the M2M connection, the gateway stores the MS information in the MS storage information storage device when migrating from the active state to the idle state, and stores the MS information in the call session management table within the gateway when it is determined as the connection other than the M2M connection.

7. The radio communication system according to claim 1, wherein
the BS recognizes whether the MS has the M2M connection or the connection other than the M2M connection in radio connection processing between the MS and the BS,
when the BS determines that the connection of the MS is the M2M connection, the BS notifies the gateway of a message between the BS and the gateway with the inclusion of the M2M identifier for the MSID,
the gateway determines whether the connection is the M2M connection or not, according to the message notified from the BS, and
when the gateway determines that the connection is the M2M connection, the gateway stores the MS information in the MS storage information storage device when migrating from the active state to the idle state, and when the gateway determines that the connection is the connection other than the M2M connection, the gateway stores the MS information in the call session management table within the gateway.

8. The radio communication system according to claim 1, wherein
the gateway includes a domain information table that stores the M2M identifier for identifying whether the connection is the M2M connection or the connection other than the M2M connection in correspondence with at least one of the call No. and the MSID,
the BS receives domain information on the domain to which the MS belongs from the MS,
the gateway sets a predetermined M2M identifier for the domain information in correspondence with one of the call No. and the MSID in the domain information table, on the basis of the domain information included in a connection message from the BS,
the gateway determines whether the connection is the M2M connection or not, on the basis of the call No. or the MSID, with reference to the domain information table, and
if the gateway determines that the connection is the M2M connection, the gateway stores the MS information in the MS storage information storage device when migrating from the active state to the idle state, and if the gateway determines that the connection is the connection other than the M2M connection, the gateway stores the MS information in the call session management table within the gateway.

9. A radio communication method in a radio communication system in which a mobile station (MS) is connected to a network through a base station (BS) to conduct a machine-to-machine (M2M) communication, the radio communication system comprising:
a gateway (GW) disposed between the BS and the network; and
an MS information storage device that transmits and receives MS information with respect to the GW, wherein
the gateway includes:
a call session management table that stores an MSID which is an identifier of the MS, state information indicating whether a session of the MS is in an active state or an idle state, and an external index (ext. index) with respect to a call number (call No.) allocated to the MS when the MS is connected to the BS;
an active session management table that stores the MS information which is information on the MS with the inclusion of an address of the MS with respect to the call No.;
an idle session management table that stores paging information on the MS with respect to the call No.; and
a control unit that executes migration processing between the active state and the idle state,
wherein,
when the MS requests migration from the active state to the idle state,
the gateway receives an idle migration request including an MSID from the BS, and searches the call No. on the basis of the MSID included in the idle migration request with reference to the call session management table,
the gateway searches an area in which the paging information is null with reference to the idle session management table according to the call No., and sets the paging information on the MS for the searched area,
the gateway searches the MS information with reference to the active session management table according to the call No., and transmits a first MS information transfer request including the MS information corresponding to the call No. to the MS information storage device,
when receiving a first MS information transfer response including the ext. index corresponding to the MS information stored in the MS information storage device from the MS information storage device, the gateway acquires the ext. index included in the first MS information transfer response,
the gateway changes the state information from the active state to the idle state with respect to the call No. and the MSID, stores the idle state to the state information in the call session management table, and stores the acquired ext. index, and
the gateway deletes the call No. and the MS information corresponding to the call No. from the active session management table,
whereby the paths for the data connection among the MS, the BS and the gateway are disconnected, and the path for the data connection between the gateway and the network is not disconnected.

10. A gateway in a radio communication system in which a mobile station (MS) is connected to a network through a base station (BS) to conduct a machine-to-machine (M2M) communication, the radio communication system comprising:
the gateway (GW) disposed between the BS and the network; and
an MS information storage device that transmits and receives MS information with respect to the GW, wherein
the gateway includes:
a call session management table that stores an MSID which is an identifier of the MS, state information indicating whether a session of the MS is in an active state or an idle state, and an external index (ext. index) with respect to a call number (call No.) allocated to the MS when the MS is connected to the BS;
an active session management table that stores the MS information which is information on the MS with the inclusion of an address of the MS with respect to the call No.;
an idle session management table that stores paging information on the MS with respect to the call No.; and
a control unit that executes migration processing between the active state and the idle state, wherein, when the MS requests migration from the active state to the idle state, the gateway receives an idle migration request including an MSID from the BS, and searches the call No. on the basis of the MSID included in the idle migration request with reference to the call session management table, the gateway searches an area in which the paging information is null with reference to the idle session management table according to the call No., and sets the paging information on the MS for the searched area, the gateway searches the MS information with reference to the active session management table according to the call No., and transmits a first MS information transfer request including the MS information corresponding to the call No. to the MS information storage device, when receiving a first MS information transfer response including the ext. index corresponding to the MS information stored in the MS information storage device from the MS information storage device, the gateway acquires the ext. index included in the first MS information transfer response, the gateway changes the state information from the active state to the idle state with respect to the call No. and the MSID, stores the idle state to the state information in the call session management table, and stores the acquired ext. index, and the gateway deletes the call No. and the MS information corresponding to the call No. from the active session management table, whereby the paths for the data connection among the MS, the BS and the gateway are disconnected, and the path for the data connection between the gateway and the network is not disconnected.

11. The radio communication method according to claim 9, wherein the MS information storage device includes an MS information storage table that stores the MS information with respect to the ext. index, and when receiving the first MS information transfer request from the gateway, the MS information storage device searches an area in which the MS information is null with reference to the MS information storage table, stores the MS information included in the first MS information transfer request in the searched area, and transfers the first MS information transfer response including the corresponding ext. index to the gateway.

12. The radio communication method according to claim 9, wherein when the MS requests the migration from the idle state to the active state, upon receiving a first active migration request including the MSID from the BS, the gateway searches an area in which the MS information is null with reference to the active session management table, if the gateway can search the area of null in the active session management table, the gateway acquires the call No. and the ext. index on the basis of the MSID with reference to the call session management table, the gateway transmits a second MS information transfer request including the acquired ext. index to the MS information storage device, when the gateway receives a second MS information transfer response including the ext. index and the MS information from the MS information storage device, the gateway extracts the MS information from the second MS information transfer response, the gateway sets the call No. and the MS information in the active session management table, the gateway changes the state information from the idle state to the active state with respect to the call No. and the MSID, stores the active state to the state information in the call session management table, and set null in the ext. index, the gateway deletes the paging information corresponding to the call No. from the idle session management table, and the gateway transmits an MS information transfer response acknowledgement to the MS information storage device in order to delete the MS information, whereby paths are established among the MS, the BS, the gateway, and the network to conduct data connection.

13. The radio communication method according to claim 12, wherein upon receiving the second MS information transfer request including the ext. index from the gateway, the MS information storage device searches the MS information on the ext. index with reference to the MS information storage table, and transmits the second MS information transfer response including the ext. index and the MS information to the gateway.

14. The radio communication method according to claim 12, wherein if there is no area of null when the gateway searches the active session management table in receiving the first active migration request, the gateway transmits a redirect request including the MSID and the ext. index to an another gateway, upon receiving the redirect request from the gateway, the another gateway searches an area in which the MS information is null with reference to the active session management table of the subject device, and transmits a redirect response for notifying the gateway that a resource is present if the another gateway can search the area of null in the active session management table, upon receiving the redirect response from the another gateway, the gateway transmits a second active migration request including the MSID to the another gateway, upon receiving the second active migration request, the another gateway searches the area in which the MS information is null with reference to the active session management table, if the another gateway can search the area of null in the active session management table, the another gateway acquires the call No. and the ext. index on the basis of the MSID with reference to the call session management table of the subject device, the another gateway transmits a second MS information transfer request including the acquired ext. index to the MS information storage device, when the another gateway receives a second MS information transfer response including the ext. index and the MS information from the MS information storage device, the another gateway extracts the MS information from the second MS information transfer response, the another gateway sets the call No. and the MS information in the active session management table, the another gateway changes the state information from the idle state to the active state with respect to the call No. and the MSID, stores the active state to the state information in the call session management table, and sets null in the ext. index, the another gateway deletes the paging information corresponding to the call No. from the idle session management table of the subject device, and the another gateway transmits an MS information transfer response acknowledgement to the MS information storage device in order to delete the MS information, whereby paths are established among the MS, the BS, the gateway, the another gateway, and the network to conduct the data connection.

15. The radio communication method according to claim 9, wherein the M2M identifier for identifying whether the connection is the M2M connection or the connection other than the M2M connection is included in the MSID, the gateway determines whether the connection is the M2M connection or not, according to the M2M identifier included in the MSID received from the BS, and if it is determined as the M2M connection, the gateway stores the MS information in the MS storage information storage device when migrating from the active state to the idle state, and stores the MS information in the call session management table within the gateway when it is determined as the connection other than the M2M connection.

16. The radio communication method according to claim 9, wherein the BS recognizes whether the MS has the M2M connection or the connection other than the M2M connection in radio connection processing between the MS and the BS, when the BS determines that the connection of the MS is the M2M connection, the BS notifies the gateway of a message between the BS and the gateway with the inclusion of the M2M identifier for the MSID, the gateway determines whether the connection is the M2M connection or not, according to the message notified from the BS, and when the gateway determines that the connection is the M2M connection, the gateway stores the MS information in the MS storage information storage device when migrating from the active state to the idle state, and when the gateway determines that the connection is the connection other than the M2M connection, the gateway stores the MS information in the call session management table within the gateway.

17. The radio communication method according to claim 9, wherein the gateway includes a domain information table that stores the M2M identifier for identifying whether the connection is the M2M connection or the connection other than the M2M connection in correspondence with at least one of the call No. and the MSID, the BS receives domain information on the domain to which the MS belongs from the MS, the gateway sets a predetermined M2M identifier for the domain information in correspondence with one of the call No. and the MSID in the domain information table, on the basis of the domain information included in a connection message from the BS, the gateway determines whether the connection is the M2M connection or not, on the basis of the call No. or the MSID, with reference to the domain information table, and if the gateway determines that the connection is the M2M connection, the gateway stores the MS information in the MS storage information storage device when migrating from the active state to the idle state, and if the gateway determines that the connection is the connection other than the M2M connection, the gateway stores the MS information in the call session management table within the gateway.

* * * * *